United States Patent
Harada et al.

(10) Patent No.: US 7,484,351 B2
(45) Date of Patent: Feb. 3, 2009

(54) DEFORMABLE STRUCTURE AND CABLE SUPPORT SYSTEM

(75) Inventors: Takashi Harada, Akashi (JP); Yuji Maeguchi, Kobe (JP); Takahiro Inada, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 397 days.

(21) Appl. No.: 11/408,001

(22) Filed: Apr. 21, 2006

(65) Prior Publication Data

US 2006/0258229 A1 Nov. 16, 2006

(30) Foreign Application Priority Data

Apr. 22, 2005 (JP) ............... 2005-125723

(51) Int. Cl.
F16G 13/16 (2006.01)
H02G 11/00 (2006.01)

(52) U.S. Cl. .......................................... 59/78.1; 248/49

(58) Field of Classification Search .................. 59/78.1, 59/900; 248/49, 51
See application file for complete search history.

(56) References Cited

U.S. PATENT DOCUMENTS

| | | | | |
|---|---|---|---|---|
| 4,582,281 A | * | 4/1986 | Van Camp | 248/51 |
| 4,840,023 A | * | 6/1989 | Borsani | 59/78.1 |
| 5,824,957 A | * | 10/1998 | Holshausen | 59/78.1 |
| 6,321,524 B1 | * | 11/2001 | Bro | 59/78.1 |
| 6,374,589 B1 | * | 4/2002 | Kunert et al. | 59/78.1 |
| 7,278,253 B2 | * | 10/2007 | Wehler et al. | 59/78.1 |

FOREIGN PATENT DOCUMENTS

| | | |
|---|---|---|
| DE | 203 05 677 U1 | 7/2003 |
| EP | 0 260 740 A2 | 3/1988 |
| EP | 0 875 695 A2 | 11/1998 |
| JP | A 58-184293 | 12/1983 |
| JP | A 62-34795 | 2/1987 |
| WO | WO 03/084721 | * 10/2003 |

* cited by examiner

Primary Examiner—David B Jones
(74) Attorney, Agent, or Firm—Oliff & Berridge, PLC

(57) ABSTRACT

In a deformable structure, connecting parts each of which has a base part are arranged longitudinally so that adjacent connecting parts are connected to each other. Respective first axes of the adjacent connecting parts are inclined to each other in a state that a spacer on one of the two adjacent base parts comes into contact with the other base part. When an external force is exerted on the deformable structure, the spacers restrain the deformable structure from being further curved into a radius of curvature smaller than a predetermined allowable radius of curvature. Most of the external force exerted on the deformable structure is born by the base parts and the spacers so that only a low force acts on the connecting parts. Thus the connecting parts do not break easily so that the deformable structure has a high strength.

12 Claims, 22 Drawing Sheets

DEFORMABLE STRUCTURE AND CABLE SUPPORT SYSTEM

CROSS REFERENCE TO RELATED APPLICATIONS

This application is based upon the prior Japanese Patent Application No. 2005-125723 filed on Apr. 22, 2005, the entire contents of which are incorporated herein by reference.

BACKGROUND OF THE INVENTION

1. Field of the Invention

The present invention relates to a deformable structure employed in a cable support system for supporting a flexible cable. More particularly, the present invention relates to a deformable structure employed in a cable support system for supporting a cable on an industrial robot.

2. Description of the Related Art

A cable is extended along the outer surface of robot arms in an industrial robot (hereinafter referred to simply as "robot"). The cable has one end connected to an end effector and the other end connected to a peripheral device, such as a power unit. The cable includes bundles of wires for carrying power to the end effector and those for carrying command signals to the end effector and bundles of pipes for carrying working fluid necessary for operating the end effector. Parts of the cable are held by a plurality of clamping members attached to the robot.

When the shafts of the robot are displaced relative to each other by operating a wrist held on a robot arm at least for twisting, bending or turning, the distance between the clamping members attached to the adjacent shafts changes. Consequently, a part of the cable extending between the clamping members is bent and the cable is tightened or slackened. In some cases the cable is excessively slackened to collide against the peripheral device, or the cable is excessively tightened to be broken, if the shafts of the robot are displaced greatly A cable support system capable of preventing the undesirable deformation of a cable is disclosed in Japanese Utility Model Laid-Open Publication No. 58-184293 (Patent document 1). This known cable support system is used on a driving apparatus having a stationary unit and a swivel unit capable of turning about a vertical axis. More specifically, a band-shaped member bent in a U-shape in a space is wound round the stationary unit and is attached to the stationary unit. Many support blocks having the shape of a rectangular pyramid are arranged densely on the curved inner surface of the band-shaped member. A cable is supported by the band-shaped member so as to wind loosely round the stationary unit. When the swivel unit turns through an angle relative to the stationary unit, the cable is deformed together with the band-shaped member in the vicinity of the axis of rotation. Thus the undesirable deformation of the cable is prevented.

A cable support system disclosed in Japanese Patent Laid-Open Publication No. 62-34795 employs chains instead of the band and the support blocks mentioned in Patent document 1. The chains form a passage having the shape of a circular arc for a cable. The adjacent chains can be turned through a predetermined angle relative to each other. This cable support system prevents the cable from being away from a driving apparatus.

Each of those known cable support systems disclosed in Patent documents 1 and 2 has a deformable cable support structure having the shape of a circular arc. The deformable cable support structure is wound round the driving apparatus. The deformable structure has a plurality of turnable segments arranged along the length thereof. Each turnable segment restrains the adjacent turnable segment from turning about an axis parallel to the axis of rotation and allows the adjacent turnable segment to turn about an axis perpendicular to the axis of rotation.

The cable support system disclosed in Patent document 1 needs a support ring for supporting the deformable structure thereon to prevent the deformation of the deformable structure by its own weight. The cable support system including the support ring is inevitably large. If the axis of rotation is horizontal, the deformable structure is unable to maintain a predetermined position and is unable to support a cable.

The deformable structure of the cable support system disclosed in Patent document 2 is formed by successively connecting a plurality of chain links with pins. The joint of the two chain links connected by the pin is loaded to maintain the deformable structure in a curved shape having a predetermined radius of curvature against the weight of the deformable structure. The two adjacent chain links connected by the joint need to be turnable relative to each other. The structural strength of the joint is low and the joint is subject to breakage. Therefore, the deformable structure cannot be formed in a large weight. The same problem arises when the axis of rotation is horizontal, a heavy cable is supported by the deformable structure, or a high acceleration is imparted to the deformable structure.

SUMMARY OF THE INVENTION

Accordingly, it is an object of the present invention to provide a cable support system having a high strength and capable of surely maintaining a predetermined deformed shape, and a deformable structure for use on the cable support system.

The present invention is a deformable structure having an elongate shape substantially resembling a circular arc which is deformable by a predetermined dimensional change, the deformable structure being adapted to be employed in a cable support system for supporting a flexible cable, comprising: a plurality of connecting parts arranged in a longitudinal axis of the deformable structure and connected to each other so that each of the connecting parts is turnable relative to an adjacent connecting part through a predetermined angle about a first axis of the connecting part intersecting the longitudinal axis; a plurality of base parts each of which is extending in a first direction parallel to the first axis so as to be connected to the connecting part; and a plurality of stopping parts each of which is formed on at least one of two longitudinally adjacent base parts, each of the stopping parts projecting from the base part in the longitudinal direction from a position different from a position of the connecting part in the first direction, the stopping part being configured to come into contact with an adjacent base part so that two first axes of two adjacent connecting parts respectively connected to the two longitudinally adjacent base parts are inclined relative to each other.

The plurality of connecting parts longitudinally arranged and connected to each other form an elongate structure extending in the longitudinal direction. The stopping part of each base part comes into contact with the adjacent base part to incline the respective first axes of the adjacent connecting parts relative to each other. The elongate structure formed by connecting the plurality of connecting parts can be extended along a circular arc of a predetermined allowable radius of curvature by inclining the respective first axes of the connecting parts at a fixed angle. In this state, the connecting part can be turned about the first axis through a predetermined angle with respect to the adjacent connecting part.

If a deforming force that deforms the deformable structure in a curve of a radius of curvature smaller than the allowable radius of curvature, namely, a force that acts to bring the two base parts on the opposite sides of the stopping part closer to each other, is exerted on the deformable structure in a state where the stopping part of one of the two adjacent connecting parts is in contact with the base part of the other connecting part, the stopping part restrains the base parts on the opposite sides thereof from further approaching each other. Thus the deformable structure is restrained from being deformed in a circular arc of a radius of curvature smaller than the predetermined allowable radius of curvature by the stopping parts.

When such a deforming force is exerted on the deformable structure, forces act on the base parts and the stopping parts because the stopping parts and the connecting parts are at different positions. Consequently, the application of a great force to the connecting parts having a low structural strength can be avoided. Therefore even if a deforming force exceeding a deforming force that deforms the deformable structure in the circular arc of the predetermined allowable radius of curvature acts on the deformable structure, the connecting parts can be prevented from breakage. Thus the strength of the deformable structure can be enhanced.

The cable support system provided with this deformable structure of the present invention can maintain a desired deformed shape without using any additional support members regardless of the position of the cable support system. For example, a cable held by the deformable structure can be extended near the outer surface of a driving apparatus, such as a robot or the like. In this specification, the term "cable" signifies a flexible long article. The flexible long article may be an electric cable, a power cable, a hose for carrying a fluid, such as cooling water, a coating material or a working fluid. In this specification, the term "shape of a circular arc" is used for indicating a nonlinear shape, such as a curved shape. The curved shape is not necessarily a shape of the circular arc and may be any curved shape such as an elliptic shape.

The deformable structure according to the present invention has a high strength. When the deformable structure is employed in a cable support system, the deformable structure is able to maintain a predetermined position regardless of the position of the cable support system even if the deformable structure or the cable has a large weight or a high acceleration is imparted to the deformable structure, and is able to support the cable near the outer surface of the driving apparatus.

Preferably, each of the base parts comprises two base parts extending in opposite first directions with respect to each of the connecting parts. Each of the stopping parts comprises two stopping parts formed on the two base parts respectively.

When the stopping parts are formed on each pair of base parts extending in opposite first directions from the connecting part, forces act on the stopping parts on the opposite sides of the connecting part with respect to the first direction and the base parts when a deforming force that deforms the deformable structure in curve of a radius of curvature smaller than the allowable radius of curvature is exerted. Consequently, the force that acts on the connecting part can be reduced and the strength of the deformable structure can be increased.

Preferably, one of the two adjacent connecting parts is configured to be able to turn relative to an other connecting part of the two adjacent connecting parts about a second axis which is perpendicular to the first axis and the longitudinal axis. Each of the stopping parts is detachably attached to one of the two longitudinally adjacent base parts.

When the stopping part is removed from one of the adjacent base parts of the two adjacent connecting parts, the former connecting part can turn relative to the latter connecting part about the second axis. When the two base parts are turned toward each other with the stopping part attached to the base part of one of the two adjacent connected connecting parts, the stopping part comes into contact with the base part of the other one of the two adjacent connecting parts to restrain the two adjacent base parts from further turning toward each other. Consequently, turning of the two connecting parts having those base parts is obstructed. Thus the stopping parts limit the turning of the adjacent base parts toward each other and hence the deformable structure is allowed to deform within a predetermined range of deformation.

The size and position of the stopping parts on the base parts are selectively determined to determine the allowable radius of curvature in which the deformable structure can be curved when the stopping parts are in contact with the base parts. Thus the allowable radius of curvature can be changed without changing the connecting parts and the base parts. Therefore, deformable structures capable of being curved respectively in different allowable radius of curvatures can be formed by using the same connecting parts and the same base parts. Thus the common use of the same connecting parts and the same base parts for forming the deformable structures capable of being curved in different allowable radius of curvatures reduces the manufacturing costs of the deformable structures.

Preferably, the stopping part has a surface facing the adjacent base part, the surface being curved about the first axis so as to form a curved surface of a fixed radius of curvature having a center on the first axis.

When the surface of the stopping part facing the other base part is curved about the first axis and is a curved surface of a fixed radius of curvature having its center on the first axis, the connecting part can be smoothly turned about the first axis relative to the adjacent connecting part in a state where the stopping part is in contact with the base part of the adjacent connecting part. Even if the former connecting part is turned about the first axis with the stopping part in contact with the base part of the latter connecting part, the first axes of the two connecting parts can be held at a fixed inclination with each other. For example, the stopping parts may be formed in a spherical shape, a cylindrical shape or a conical shape.

Preferably, the adjacent base part has a contact part with which an adjacent stopping part comes into contact, the contact part being configured to be in contact with the stopping part on both sides with respect to an imaginary plane containing the longitudinal axis and the first axis.

Since the contact part is in contact with the stopping part on both the sides with respect to the imaginary plane containing the longitudinal axis and the first axis, the connecting part is restrained from turning about the longitudinal axis relative to the adjacent connecting part. Thus the cable extended along the arrangement of the connecting parts can be prevented from being twisted about the longitudinal axis.

Preferably, the deformable structure further comprises a retaining member configured to retain the stopping part in contact with the adjacent base part.

When the stopping part on one of the two adjacent base parts is held in contact with the other base part by the retaining member, the base part is prevented from turning due to a separation from the adjacent stopping part. Thus undesired turning of the connecting part relative to the adjacent connecting part can be prevented.

The present invention is a cable support system adapted to be installed on a driving apparatus including a first driving unit and a second driving unit capable of turning about a predetermined rotational axis relative to the first driving unit to support a flexible cable extending between the first driving unit and the second driving unit, comprising: a first fixing part fixed to the first driving unit; a second fixing part fixed to the second driving unit so as to be apart from the first fixing part in a direction of the rotational axis; any one of the aforementioned deformable structures, the deformable structure having a first end fixed to the first fixing part and a second end fixed to the second fixing part so as to extend in a curve around the driving apparatus, each of the connecting parts being restrained from turning about an axis parallel to the rotational axis relative to an adjacent connecting part by each of the stopping parts and allowed to turn about an axis perpendicular to the rotational axis through a predetermined angle; and a holding member configured to hold a cable along the longitudinal axis of the deformable structure.

The cable support system according to the present invention includes the deformable structure mentioned above. The deformable structure is curved so as to extend loosely around the driving apparatus and is restrained from being radially away from the driving apparatus. For example, when the axis of rotation is horizontal, the stopping parts restrain the deformable structure from sagging down under its own weight. Thus the deformable structure can remain staying near the driving apparatus.

The deformable structure can remain staying near the driving apparatus also in a case where the second driving unit turns about the axis of turning relative to the first driving unit. Since the deformable structure is allowed to deform about an axis perpendicular to the axis of rotation, one of the opposite ends of the deformable structure can move about the axis of rotation relative to the other end. When the second driving unit turns relative to the first driving unit, the second fixing part turns about the axis of rotation relative to the first fixing part. In this state, the deformable structure deforms such that the positional relation between the opposite ends thereof with respect to a circumferential direction changes according to the change of the positional relation between the first and the second fixing part with respect to a circumferential direction. Thus the deformable structure deforms without being away from the driving apparatus.

Since the cable is held by the holding members on the deformable structure, the cable will not be away from the driving apparatus even if the cable is slackened together with the deformable structure. Collision of the cable against the driving apparatus and the peripheral devices can be prevented and the cable will not obstruct the motions of the driving apparatus. The cable will not be excessively tightened and can be prevented from breakage.

The cable support system supports the cable by the deformable structure. The cable support system does not need any support mechanism for supporting the deformable structure. Therefore, the cable support system is simple in construction. Since any support members for supporting the deformable structure are unnecessary, the cable support system can be formed in a small size. The cable will not be damaged because the cable does not slide on support members. Since the deformable structure has a high strength, the deformable structure will not be broken and can support the cable near the driving apparatus under the weight of the cable even if a high external force is exerted on the deformable structure when the cable support system is set to some position or when the cable support system is moved at a certain moving speed.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
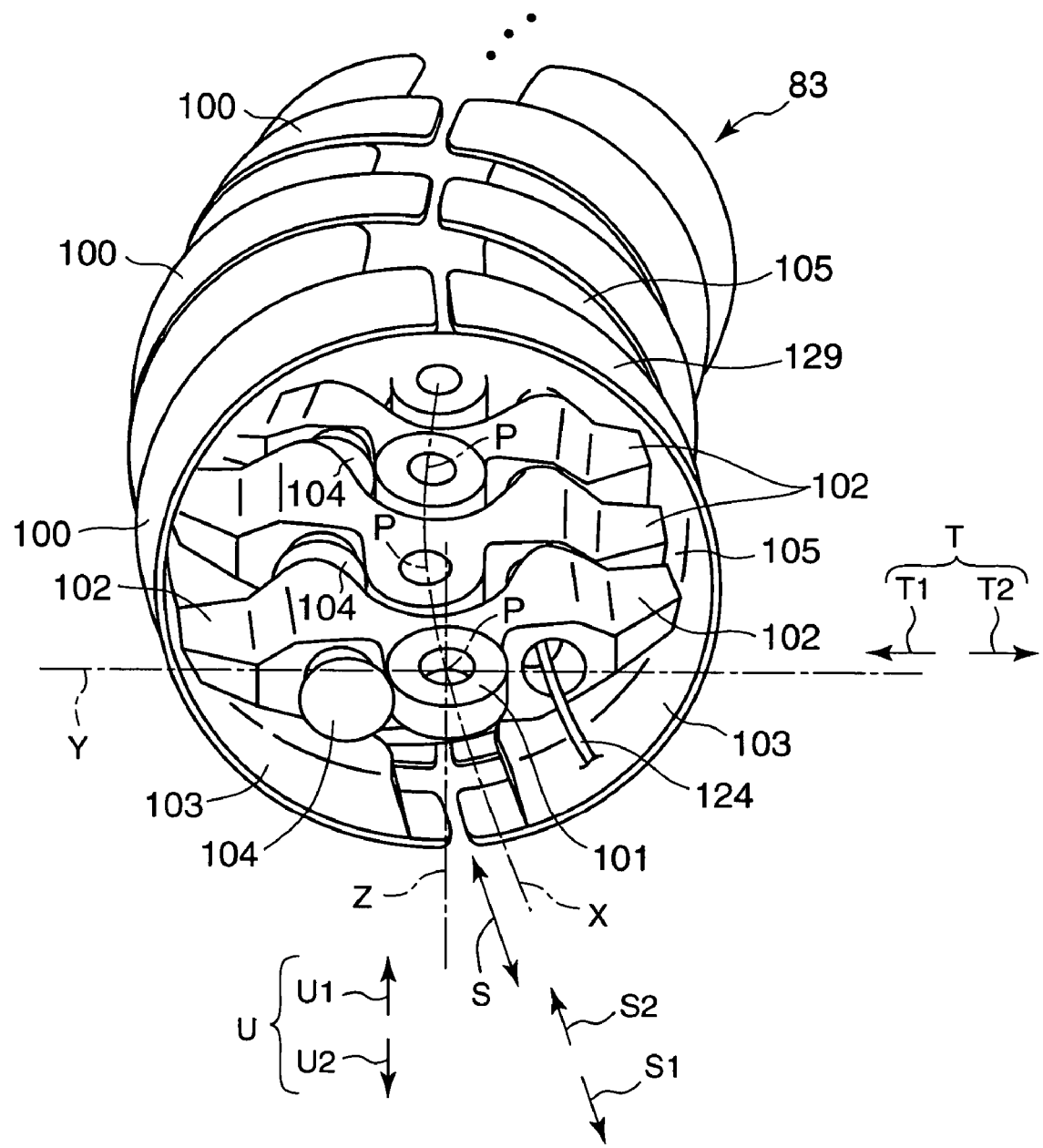
FIG. 1 is a fragmentary perspective view of a deformable structure in an embodiment according to the present invention.

As shown in FIG. 1, the deformable structure 83 is an elongate structure of a shape substantially resembling a circular arc. The deformable structure 83 can be deformed in a predetermined deforming direction by a predetermined amount of deformation and cannot be deformed in a predetermined undeformable direction. The deformable structure 83 is an integral component of a cable support system, which will be described later. The cable support system supports a cable so as to extend around a driving apparatus of a robot or the like.

The deformable structure 83 is formed in the shape of a circular arc having a predetermined radius of curvature. The deformable structure 83 has a plurality of turnable segments 100 arranged in a direction S parallel to a longitudinal axis X. The turnable segments 100 are arranged at equal intervals in a longitudinal direction S and the adjacent turnable segments 100 are connected with each other. One of the two adjacent turnable segments 100 can turn within a predetermined angular range on a turning point P specified thereon relative to the other turnable segment 100. Thus the deformable structure 83 formed by successively connecting the turnable segments 100 can be deformed.

Each turnable segment 100 has a connecting part 101, base parts 102 and stopping parts 104 and 105. The connecting parts 101 of the two adjacent turnable segments 100 arranged in the longitudinal direction S are connected. The connecting part 101 of the former turnable segment 100 is connected to the connecting part 101 of the latter turnable segment 100.

A first axis Y is defined on the connecting part 101. The first axis Y intersects the longitudinal axis S. In this embodiment, the first axis Y is perpendicular to the longitudinal axis X. One of the two connected connecting part 101 can turn through a predetermined angle about the first axis Y defined thereon relative to the other connecting part 101. The connecting part 101 can turn through a predetermined angle about a second axis Z perpendicular to the longitudinal axis X and the first axis Y. In this embodiment, the two connected connecting parts 101 are connected by a ball joint so that the connecting parts 101 can turn relative to each other about the first axis Y and the second axis Z.

The base parts 102 are formed integrally with the connecting part 101. The base parts 102 are continuous with the connecting part 101 and extend in first directions T1 and T2 parallel to the first axis Y. The base parts 102 extend from the connecting part 101 in the opposite first directions T1 and T2 parallel to the first axis Y, respectively. The base parts 102 have a shape substantially resembling a plate. The connecting part 101 is formed between the base parts 102.

The stopping parts 104 and 105 determine a predetermined allowable radius of curvature in which the deformable structure 83 can be curved. The stopping parts 104 and 105 are formed on at least one of the two longitudinally adjacent base parts 102. The stopping parts 104 and 105 protrude in the longitudinal direction S from positions on the base parts 102 separated from the connecting part 101. In this embodiment, all the base parts 102 are provided with the stopping parts 104 and 105. The stopping parts 104 and 105 formed on one of the two longitudinally adjacent pairs of base parts 102 can come into contact with the other pair of base parts 102. The respective first axes Y of the connecting part 101 of the former pair of base parts 102 and the connecting part 101 of the latter pair of base parts 102 can extend at an angle to each other when the stopping parts 104 and 105 formed on one of the two longitudinally adjacent pairs of base parts 102 come into contact with the other pair of base parts 102. In this embodiment, the stopping parts 104 and 105 are formed in outer end parts of the base parts 102, respectively. The stopping part 104 formed on the base part 102 extending in the first direction T1 is a spacer 104 detachably attached to the base part 102. The stopping part 105 formed on the base part 102 extending in the first direction T2 is a part of a cover 103 extending around the longitudinal axis X.

Figure 2:
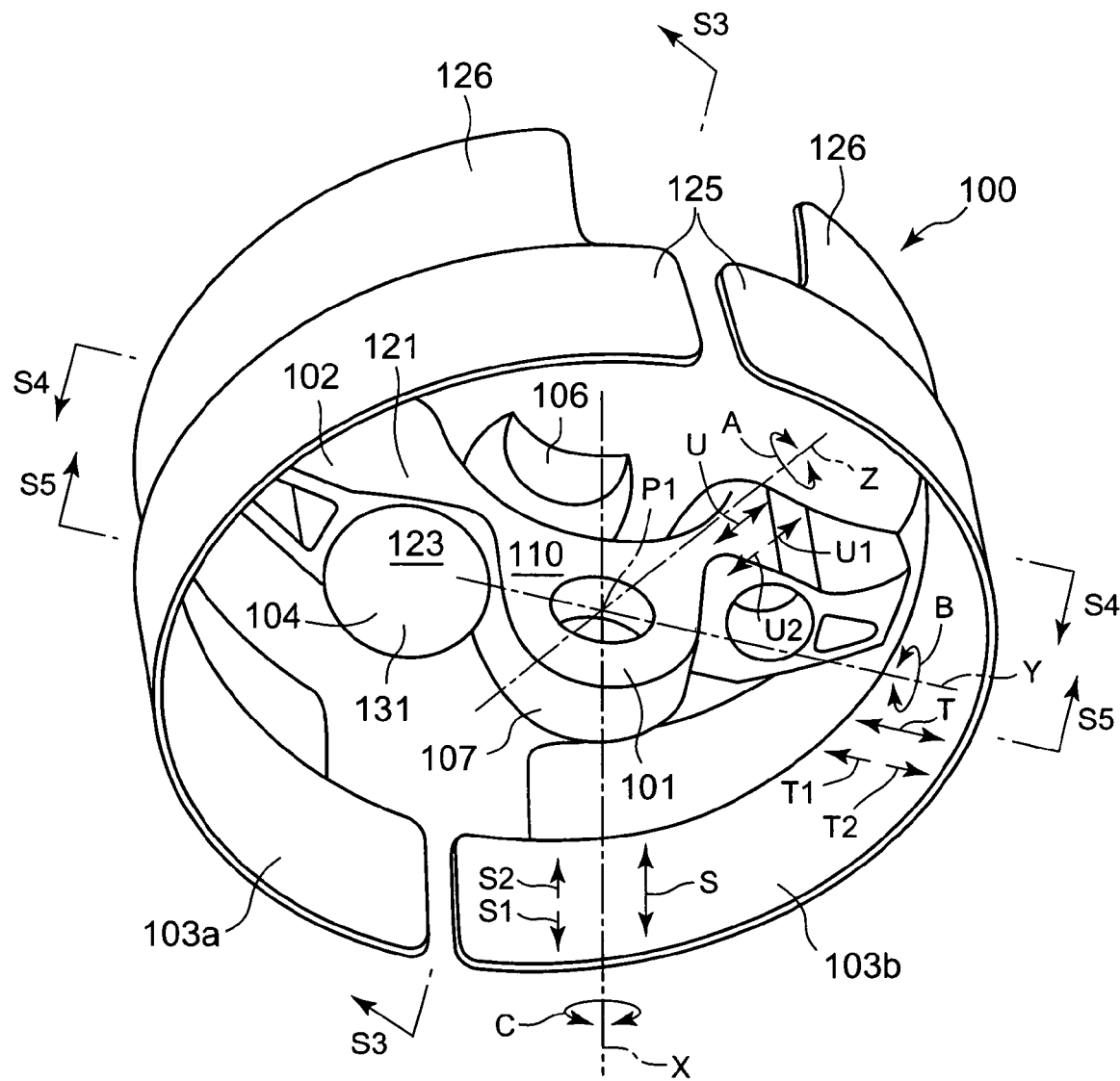
FIG. 2 is an enlarged perspective view of a turnable segment.

FIG. 2 is an enlarged perspective view of the turnable segment 100. The longitudinal axis X is parallel to the longitudinal direction S, the first axis Y is perpendicular to the longitudinal axis X, and the second axis Z is perpendicular to the longitudinal axis X and the first axis Y. The first direction T is parallel to the first axis Y. A second direction U is parallel to the second axis Z.

The connecting part 101 has a central part 110, a first joining part 107 protruding in a first longitudinal direction S1 from the central part 110, and a second joining part 106 protruding in an opposite second longitudinal direction S2 from the central part 110. The first joining part 107 is connected to the connecting part 101 adjacent to the connecting part 101 with respect to the first longitudinal direction S1. The second joining part 106 is connected to the connecting part 101 adjacent to the connecting part 101 with respect to the second longitudinal direction S2.

In this embodiment, the two connecting parts 101 are connected by a ball joint having a spherical pair. When the two connecting parts 101 are connected simply, one of the connecting pat 101 can turn in optional directions about a turning point P on the joint of the connecting parts 101.

Figure 3:
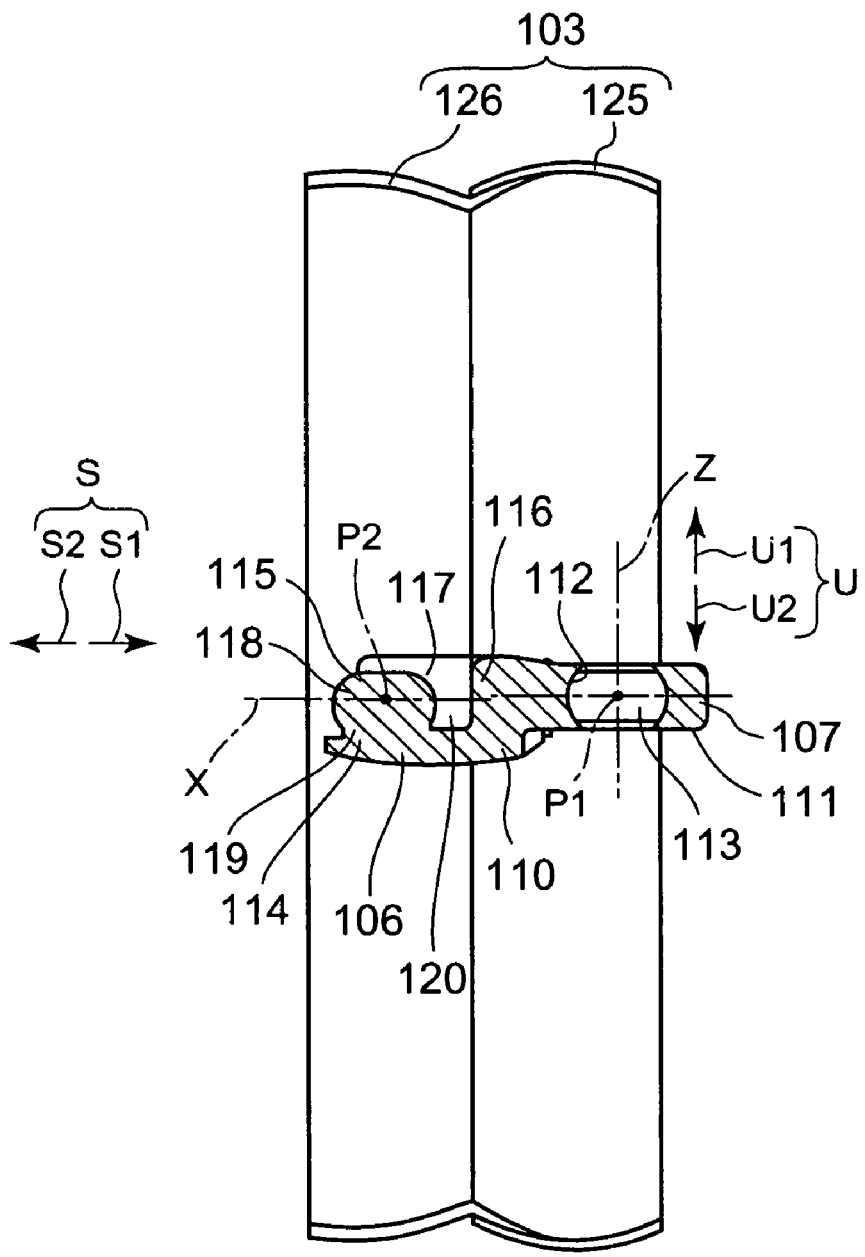
FIG. 3 is a sectional view of the turnable segment taken on the line S3-S3 in FIG. 2.
Figure 4:
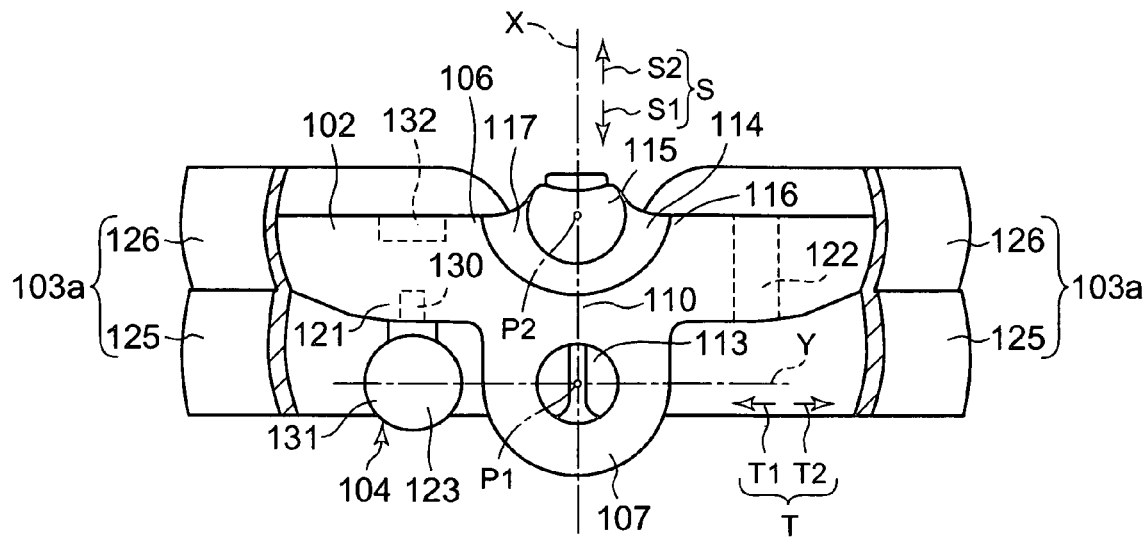
FIG. 4 is a sectional view of the turnable segment taken on the line S4-S4 in FIG. 2.
Figure 5:
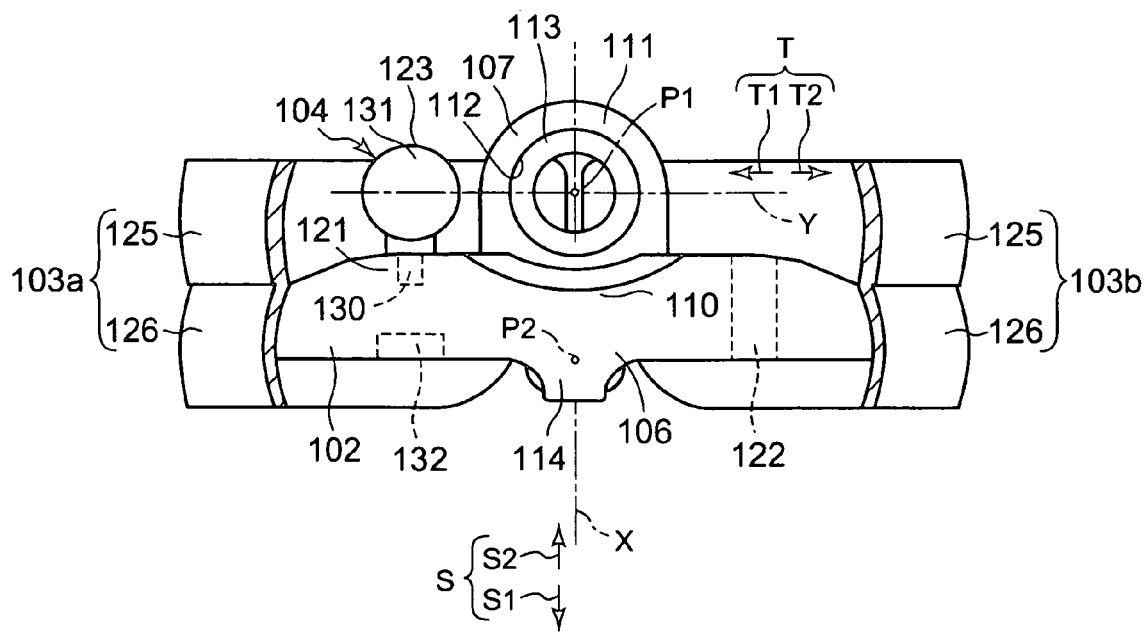
FIG. 5 is a sectional view of the turnable segment taken on the line S5-S5 in FIG. 2.

Referring to FIGS. 3 to 5, the first joining part 107 has a shape substantially resembling a plate and is continuous with the central part 110. The first joining part 107 protrudes in the first longitudinal direction S1 from a part on the side of a second direction U1 of the central part 110. A projective figure of the first joining part 107 on a plane perpendicular to the second axis Z is semicircular. A dimension of the joining part 107 along the first direction decreases in the first longitudinal direction S1. A socket 113 is formed in the first joining part 107 so as to concave in one second direction U1 from a surface 111 facing in the other second direction U2. A surface 112 of the first joining part 107 facing the socket 113 is a part of an imaginary sphere having its center on a first turning point P1 on the first joining part 107. The diameter of the socket 113 in a plane perpendicular to the second axis Z increases from the surface 111 facing in the other second direction U2 toward one second direction U1 until the longitudinal axis S and decreases from the longitudinal axis S toward one second direction U1. The first joining part 107 and the socket 113 are coaxial with respect to a plane perpendicular to the second axis Z. The first turning point P1 is at a position on the longitudinal axis X at a distance in the first longitudinal direction S1 from the central part 110.

The second joining part 106 has a substantially U-shaped circumferential wall 116 continuous with the central part 110, a bottom part 114 continuous with the circumferential wall 116, and a protrusion 115 protruding in one second direction U1 from the bottom part 114. The circumferential wall 116 has a semicylindrical shape convex in the first longitudinal direction S1. The circumferential wall 116 is curved in a U-shape about a second turning point P2 on the second joining part 106. The second turning point P2 is at a position on the longitudinal axis X at a distance from the central part 110 in the second longitudinal direction S2.

The bottom part 114 lies on the side of the other second direction U2 with respect to the side surface 111 of the first joining part 107 facing the second direction so as to cover an end part 120 of the circumferential wall 116 on the side of the other second direction U2. The bottom part 114 extends on the side of the second longitudinal direction S2 with respect to at least the second turning point P2. The protrusion 115 protrudes in the second direction U1 from the bottom part 114 beyond the second turning point P2. The protrusion 115 has a spherical part 118 having its center on the second turning point P2 and a connecting part 119 extending between the spherical part 118 and the bottom part 114. The diameter of the spherical part 118 in a plane perpendicular to the second axis Z increases with distance from the connecting part 119 in the second direction U1 until the longitudinal axis X and decreases with distance from the longitudinal axis X in the second direction U1. The diameter of the spherical part 118 is approximately equal to the diameter of the socket 113. The protrusion 115 is spaced from the circumferential wall 116. A projective figure of the second joining part 106 on a plane perpendicular to the second axis Z is substantially U-shaped. The second joining part 106 is provided with a recess 117 having a dimension along the first direction T decreasing in the first longitudinal direction S1. The recess 117 has a diameter greater than that of the first joining part 107.

The first joining part 107 of one of the two adjacent joining parts 101 arranged in the longitudinal direction S is fitted in the recess 117 of the second joining part 106 of the other connecting part 101. The spherical part 118 of the protrusion 115 of the second joining part 106 is fitted in the socket 113 of the first joining part 107. The second turning point P2 on the second joining part 106 coincides with the first turning point P1 on the first joining part 107. In a state where the two connecting parts 101 are connected, a gap is formed between the circumferential wall 116 and the bottom part 114 of the second joining part 106 of one of the connecting parts 101 and the first joining part 107 of the other connecting part 101.

Thus separation of the spherical part 118 from the socket 113 can be prevented and the spherical part 118 can turn in the socket 113. Consequently, one of the two adjacent connecting parts 101 can turn relative to the other connecting part 101 about the turning point P in a predetermined angular range.

When the plurality of connecting parts 101 are connected, the spacer 104 is held between the respective base parts 102 of the adjacent connecting parts 101. The spacer 104 can limit the turning of the connected, adjacent connecting parts 101 relative to each other. Each base part 102 has a holding part 121. The spacer 104 is seated detachably in the holding part 121. In this embodiment, the holding part 121 is formed in a side part of the base part 102 on the side of the first longitudinal direction S1 and the first direction T1.

The spacer 104 is combined with the base part 102 by seating the spacer 104 on the holding part 121. The spacer protrudes in the first longitudinal direction S1 from the base part 102 at a position at a distance from the first joining part 107 in the first direction T1. The spacer 104 has a base part 130 received in the holding part 121 and a spacing part 131 continuous with the base part 130 and protruding in the first longitudinal direction S1 from the base part 102. In this embodiment, the spacers 104 of the same shape are fitted in all the base parts 102, respectively.

The base part 130 is cylindrical. The base part 130 is fitted in a recess formed in the holding part 121. The spacing part 131 is substantially spherical. The spacing part 131 has a surface 123 facing the first longitudinal direction S1 in a state where the base part 130 is fitted in the recess formed in the holding part 121. The surface 123 has a fixed radius of curvature and extends in a curve about an axis parallel to the first direction T1. The surface 123 is a curved surface convex in the first longitudinal direction S1. The surface 123 is brought into contact with the base part 102.

The base part 102 has a contact part 132 with which the spacer 104 on the base part 102 adjacent to the former with respect to the longitudinal direction S comes into contact. The contact part 132 of base part 102 is opposite the spacer 104 held in the holding part 121 of the base part 104 adjacent to the former base part 102 and is provided with a recess coaxial with the spacer 104. The recess is a longitudinal, cylindrical insertion hole parallel to the longitudinal direction S formed in the base part 102. An end part of the spacing part 131 of the spacer 104 engages in the recess. The diameter of the recess is smaller than that of the spacing part 131. The contact part 132 comes into contact with the spacer 104 on the opposite sides with respect to an imaginary plane containing the longitudinal axis X passing the second turning point P2 in the longitudinal direction S and the first axis Y. In this embodiment, the surface 123 of the spacer 104 comes into contact with an open part of the contact part 132 corresponding to the recess. Thus the circular part of the surface 121 of the spacer 104 is in contact with the contact part 132.

A through hole 122 extending in the longitudinal direction S is formed in the opposite part of the base part 102 with respect to the first direction T. A long wire 124 is passed through the through holes 122 of base parts 104. The diameters of opposite end parts of the wire 124 are greater than the diameter of the through holes 122. The distance between the opposite ends of the wire 124 is reduced after passing the wire 124 through all the through holes 122 successively to exert a force on the base parts 102 so that the side parts of the base parts 102 on the side of the first direction T2 are pressed toward each other with respect to the longitudinal direction S. Undesirable deformation of the deformable structure 83 can be prevented by the wire 124.

Figure 6:
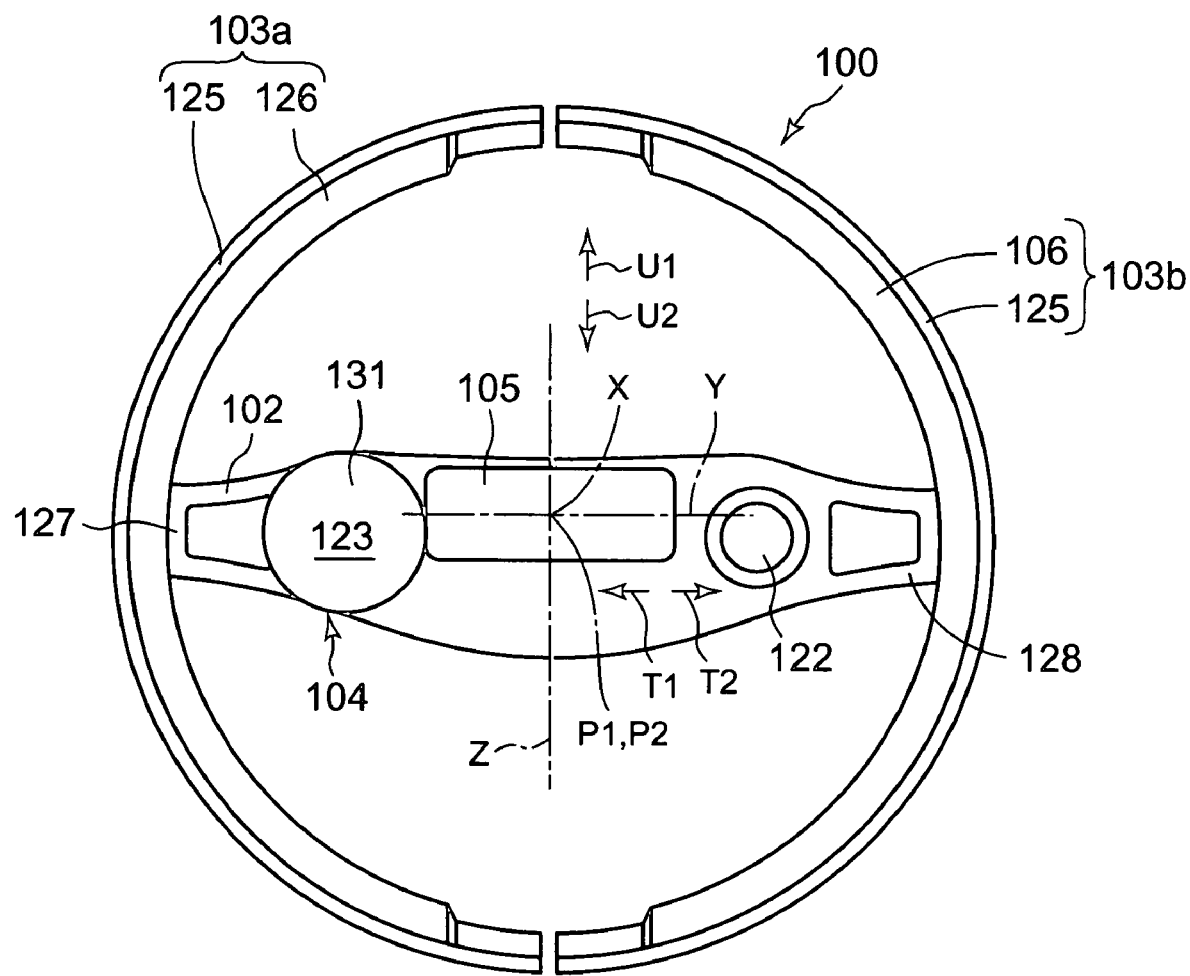
FIG. 6 is a front elevation of the turnable segment shown in FIG. 2.

FIG. 6 is a front elevation of the turnable segment 100. In this embodiment, a first cover 103a is formed continuously with a side part 127 of the base part 102 on the side of one first direction T1. The first cover 103a has a semicircular shape curving about the longitudinal axis X around the base part 102. A second cover 103b is formed continuously with a side part 128 of the base part 102 on the side of the other first direction T2. The second cover 103b has a semicircular shape curving about the longitudinal axis X around the base part 102. Accordingly, the turnable segment 100 is formed in a substantially cylindrical shape by forming the two covers 103a, 103b. Each cover 103a, 103b functions as a retainer which prevents the cable being away from the connecting part 101.

Each of the covers 103a and 103b has an outer shell 125 and an inner shell 126. The outer shell 125 of each of the covers 103a and 103b extends in the first longitudinal direction S1 and the inner shell 126 of each of the covers 103a and 103b extends in the second longitudinal direction S2. The outer shell 125 has a semicylindrical shape extending in a circular arc having a central angle approximately equal to 180°. The inner shell 126 is continuous and coaxial with the outer shell 125. The outer shell 125 has an inside diameter approximately equal to the outside diameter of the inner shell 126. The inner surface of the outer shell 125 extends along an imaginary sphere having its center at the first turning point P1. The outer surface of the inner shell 126 extends along an imaginary sphere having its center at the second turning point P2.

In the two connected adjacent connecting parts 101, the inner shell 126 of the connecting part 101 on the side of the first longitudinal direction S1 underlies the outer shell 125 of the connecting part 101 on the side of the longitudinal direction S2. Since each of the inner surface of the outer shell 125 and the outer surface of the inner shell 126 is a part of a sphere, the outer shell 125 keeps partly covering the inner shell 126 when the adjacent connecting members 101 are turned relative to each other. Thus the connecting parts can turn smoothly relative to each other.

The inner shell 126 of the cover 103 is connected to the base part 102. An end of the inner shell 126 on the side of the longitudinal direction S1 is connected to the base part 102 and the inner shell 126 extends from the base part 102 in the longitudinal direction S2. When one of the two connected, adjacent connecting parts 101 are turned relative to the other connecting part 101 about an axis passing the turning point P and extending parallel to the second direction U, the inner shell 126 connected to the base part of the latter connecting part 101 comes into contact with the base part 102 of the former connecting part 101. Thus the former connecting part 101 is restrained from further turning about the axis passing the turning point P and parallel to the second direction U relative to the latter connecting part 101. Thus the inner shell 126 of the cover 103 serves together with the spacer 104 as a stopping part 105 for limiting the turning of the connecting part 101.

Hereinafter, the spacer 104 may be referred to as a first stopping part 104 and the inner shell 126 disposed opposite to the spacer 104 with respect to the connecting part 101 may be referred to as a second stopping part 105 when necessary. The stopping part 104 on the base part 102 comes into contact with the adjacent base part 102 and thereby the adjacent base parts 102 are restrained from further approach to each other in the longitudinal direction S on the side of one first direction T1. The second stopping part 105 of one of the two adjacent base parts 102 comes into contact with the other base part 102 and thereby the adjacent base parts 102 are restrained from further approach to each other in the longitudinal direction S on the side of the other first direction T2.

In a state where the first axes Y set on the two adjacent connecting parts 101, respectively, are parallel, the distance between the holding part 121 of the base part 102 of one of the two connecting part 101 and the contact part 132 of the base part 102 of the other connecting part 101 is shorter than the longitudinal dimension of the first stopping part 104. In other words, the first stopping part 104 and the second stopping part 105 enter a space between the two adjacent base parts 102 so that the first axes Y set on the two adjacent connecting parts 101, respectively, are inclined. Consequently, the first axes Y set on the two adjacent connecting parts 101, respectively, are inclined to each other.

In this embodiment, the first stopping part 104 and the second stopping part 105 of the base part 102 of one of the two adjacent connecting parts 101 come into contact with the base part 102 of the other connecting part 101. Thus the first stopping part 104 and the second stopping part 105 set the first axes Y adjacent to each other with respect to the longitudinal direction S at fixed inclinations. Therefore, the deformable structure 83 extends in a shape substantially resembling a circular arc of a predetermined radius of curvature and the turnable segments 100 can turn about the first axes Y relative to the adjacent turnable segments 100.

Figure 7:
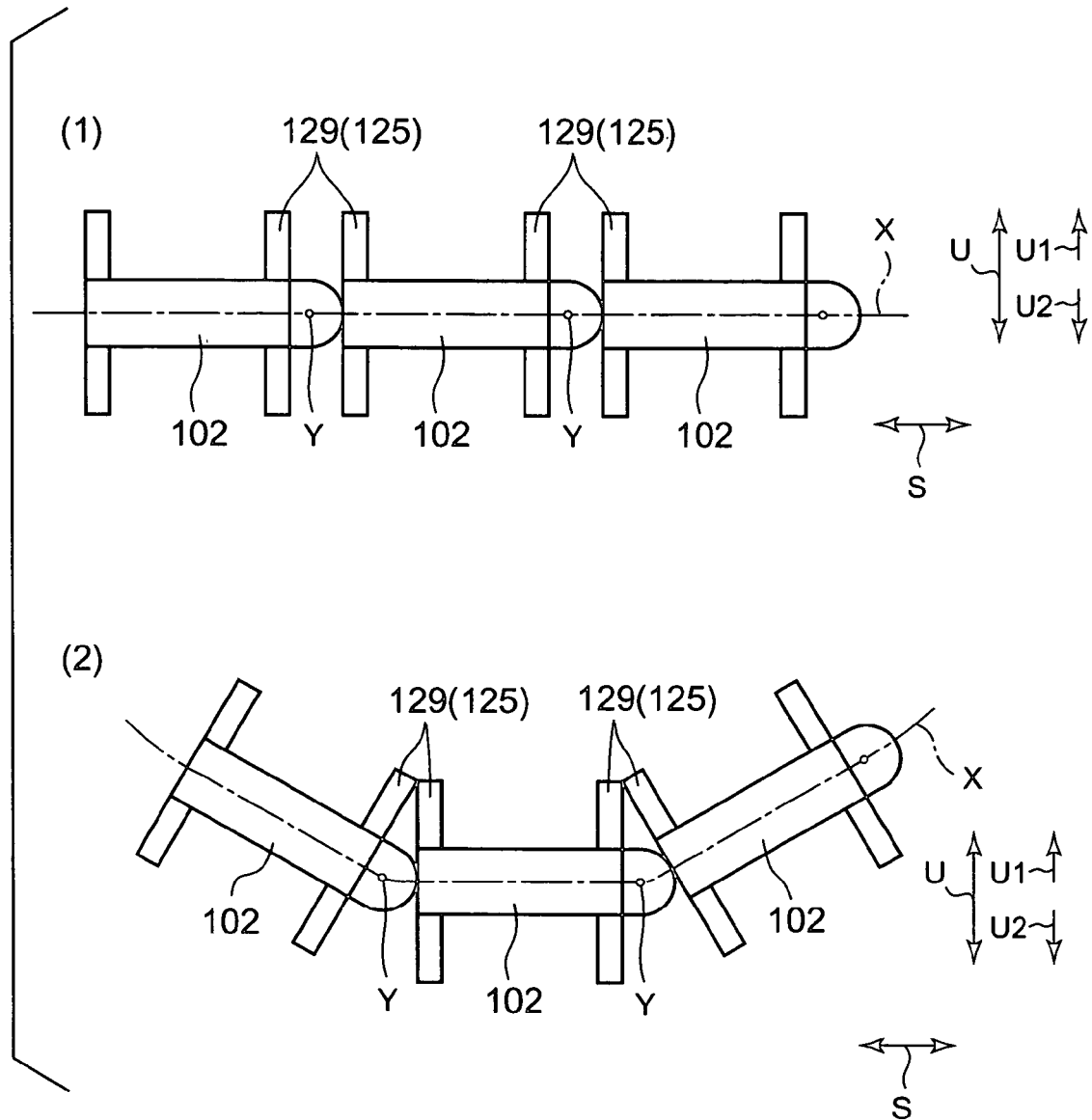
FIG. 7 is a typical view of assistance in explaining stopping parts included in the deformable structure shown in FIG. 1.

FIG. 7 is a typical view of the deformable structure 83 for assistance in explaining stopping parts 129. FIG. 7(1) shows the deformable structure 83 in a state where the longitudinal axis X is straight and FIG. 7(2) shows the deformable structure 83 in a state where the longitudinal axis X is curved in the second direction U. The turnable segment 100 has the stopping part 129 for restraining the turnable segment 100 from turning about the first axis Y through an angle beyond a predetermined angle. In this embodiment, the stopping parts 129 are formed on the base part 102 so as to project in the second directions U1 and U2. More concretely, the stopping parts 129 are the outer shells 125 of the covers 103 extending from the opposite ends on the sides of the first directions T1 and T2 of the base part 102 in the second directions U1 and U2. Since the stopping parts 129 are formed on the base parts 102 so as to extend in the second directions U, the connecting part 101 are allowed to turn through angles not greater than a predetermined angle about the first axis Y in opposite directions.

When the base part 102 of one of the two adjacent connecting parts 101 are turned through a predetermined angle about the first axis Y relative to the base part 102 of the other connecting part 101 in the state shown in FIG. 7(1) where the longitudinal axis X is straight, the stopping part 129 on the base part 102 of one of the two adjacent connecting parts 101 comes into contact with the stopping part 129 on the base part 102 of the other connecting part 101 as shown in FIG. 7(2). Then, the former base part 102 is unable to turn further relative to the latter base part 102. Thus the base part 102 is restrained from turning through angles not smaller than the predetermined angle.

Figure 8:
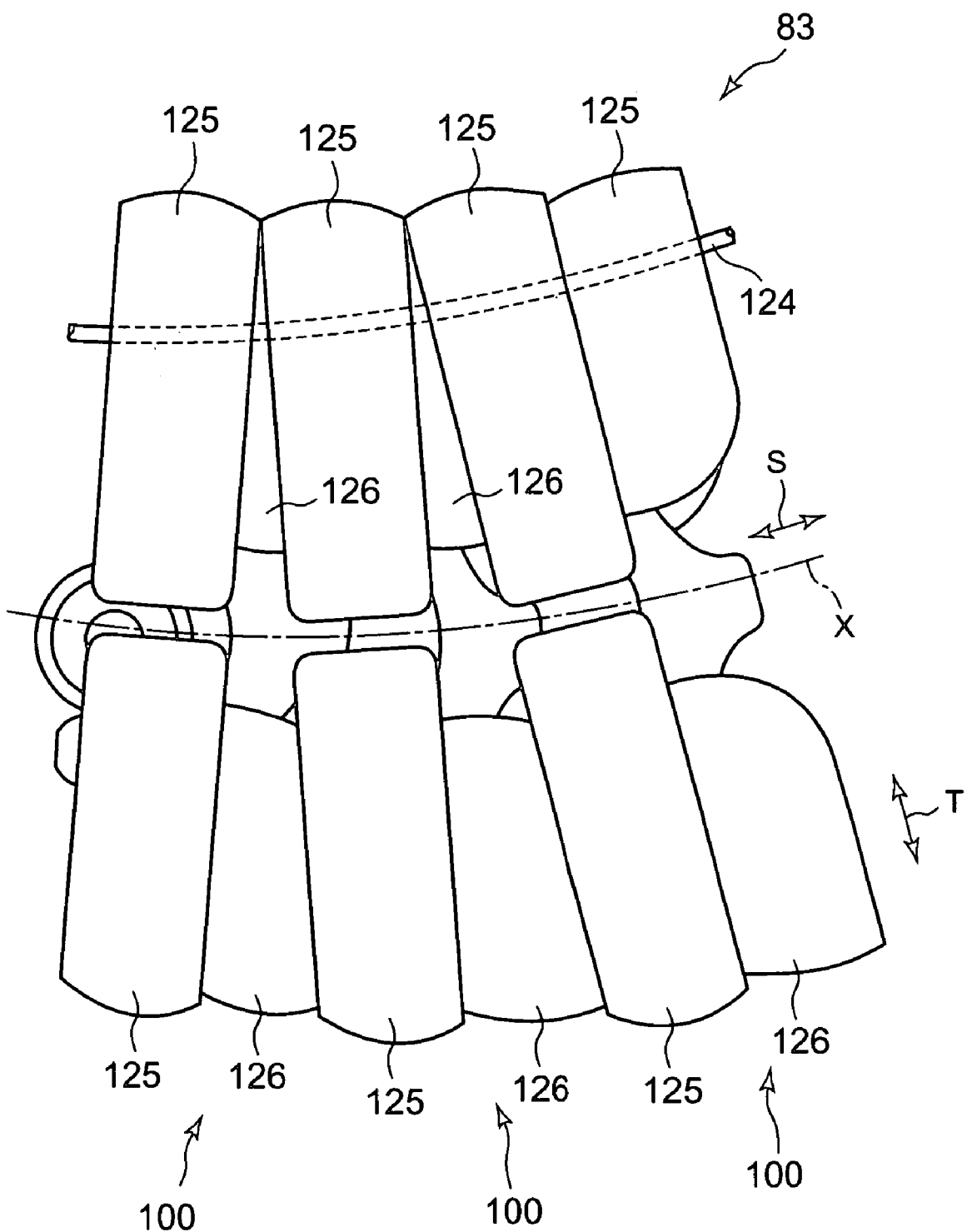
FIG. 8 is a fragmentary plan view of the deformable structure shown in FIG. 1.
Figure 9:
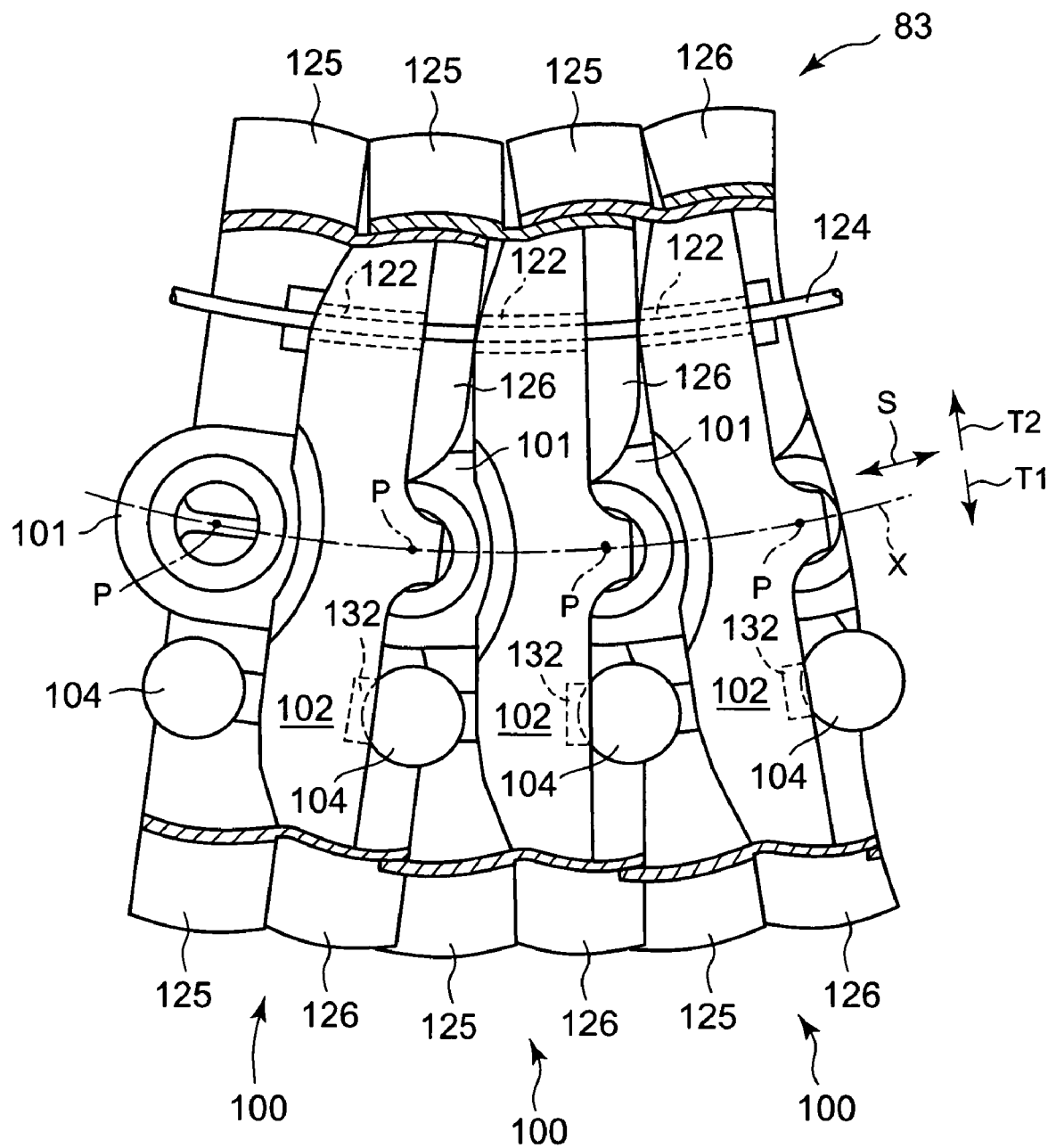
FIG. 9 is a fragmentary sectional view of the deformable structure shown in FIG. 1.

FIG. 8 is a fragmentary plan view of the deformable structure 83 and FIG. 9 is a fragmentary sectional view of the deformable structure 83. The two connecting parts 101 adjacent to each other with respect to the longitudinal direction S are connected together by the ball joint. Therefore, one of the two adjacent connecting parts 101 can turn in an optional direction about the turning point P within a predetermined angular range relative to the other connecting part 101 if the spacers 104 are not attached to the base parts 102 of the connecting parts 101.

As shown in FIG. 9, the spacer 104 is attached to the base part 102 so as to lie between the respective base parts 102 of the two adjacent turnable segments 100 adjacent to each other with respect to the longitudinal direction S. In a state where the spacer 104 is lying between the adjacent base parts 102, the inner shell 126 opposite the spacer 104 with respect to the connecting part 101 and continuous with the base part 102 of one of the two adjacent connecting parts 101 comes into contact with the base part 102 of the other connecting part 101. Thus the adjacent base parts 102 are restrained from turning about the second axis Z passing the turning point P relative to each other from a state where the spacer 104 lies between the adjacent base parts 102 and are allowed to be displaced in the rest of the directions.

The deformable structure 83 is restrained from curving in curves of radii of curvatures smaller than the predetermined radius of curvature by the first stopping part 104 and the second stopping part 105 disposed on the opposite side of each connecting part 101 with respect to the first direction T. Thus the first stopping parts 104 and the second stopping parts 105 determine the allowable radius of curvature of the deformable structure 83. The deformable structure 83 curved in the first direction T is deformable in the second direction U because the connecting parts 101 are allowed to turn respectively about the first axes Y through a predetermined angle. Thus each turnable segment 100 is restrained from turning about the predetermined second axis Z in a direction A relative to the adjacent turnable segment 2 as shown in FIG. 2. The turnable segment 100 is allowed to turn about the first axis X through a predetermined angle in a direction C.

The wire 124 presses the base parts 102 on the side of the first direction T2 together with respect to the longitudinal direction S to ensure that the deformable structure 83 maintains a curved shape and to enhance the rigidity of the curved structure 83. The deformable structure 83 can be deformed by exerting a deforming force of a predetermined magnitude on the deformable structure 83. Thus the undesirable deformation of the deformable structure 83 by a deforming force of a magnitude smaller than the predetermined magnitude can be avoided. The wire 124 exerts continuously a force for gathering the base parts 102 on the side of the first direction T2 on the base parts 102. Thus the wire 124 serves as a retaining member for retaining the second stopping part 105 on one of the two adjacent base parts 102 in contact with the other base part 102.

Figure 10:
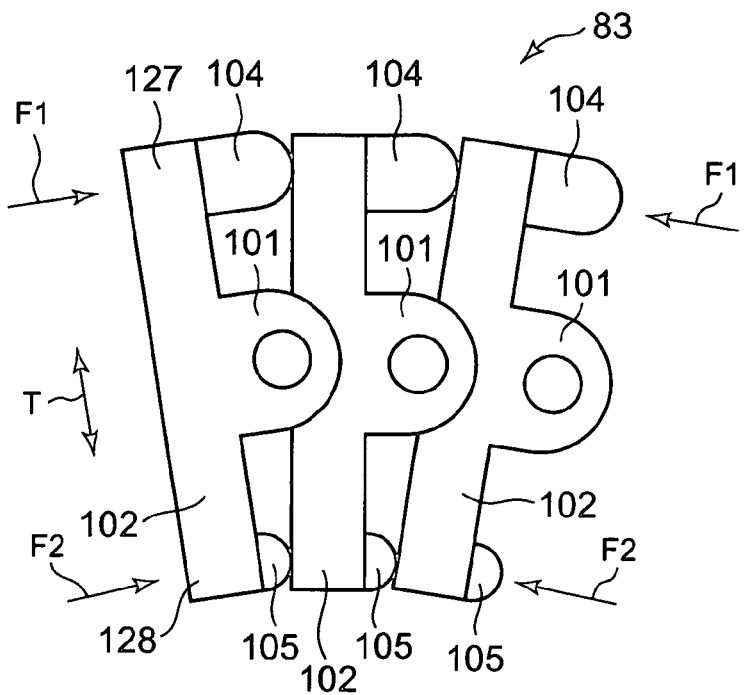
FIG. 10 is a typical plan view of the deformable structure shown in FIG. 1.

FIG. 10 is a typical plan view of the deformable structure 83. When the deformable structure 83 is employed in a cable support system, an external deforming force acts on the deformable structure 83. In some cases, external deforming forces F1 and F2 high enough to change the allowable radius of curvature of the deformable structure 83 act on the deformable structure 83.

If such external deforming forces F1 and F2 are exerted on the deformable structure 83, the stopping parts 104 and 105 on one of the two adjacent base parts 102 come into direct or indirect contact with the other base part 102 to maintain the predetermined allowable radius of curvature of the deformable structure 83 and the deformation of the deformable structure 83 in a curve of a radius curvature smaller than the allowable radius of curvature can be prevented. Since the stopping parts 104 and 105 are formed on the connecting part 101 at different positions, respectively with respect to the first direction T, a limited force is exerted on the connecting parts 101 even if such high external deforming forces are exerted on the deformable structure 83.

For example, if the external deforming force F1 that reduces the distance between the side parts 127 of the adjacent base parts 102 on the side of the first direction T1 is exerted on the deformable structure 83, most part of the external deforming force F1 is born by the base part 102 and the first stopping part 104 and only a low force acts on the connecting part 101 having a low structural strength. If the external deforming force F2 that reduces the distance between the side parts 128 of the adjacent base parts 102 on the side of the first direction T2 is exerted on the deformable structure 83, most part of the external deforming force F2 is born by the base part 102 and the second stopping part 105 and only a low force acts on the connecting part 101 having a low structural strength.

Even if a high external deforming force high enough to change the allowable radius of curvature of the deformable structure 83 is exerted on the deformable structure 83, the breakage of the connecting parts 101 can be avoided. Thus the deformable structure 83 has a sufficiently high strength. In this embodiment, the stopping parts 104 are disposed on the opposite sides of the connecting parts 101. Therefore, the connecting parts 101 do not undergo a high force even if either of a high external force that can curve the deformable structure 83 in a radius of curvature smaller than the allowable radius of curvature and an external force that can curve the deformable structure 83 in a radius of curvature greater than the allowable radius of curvature act on the deformable structure 83. Thus the deformable structure 83 has a high strength.

Figure 11:
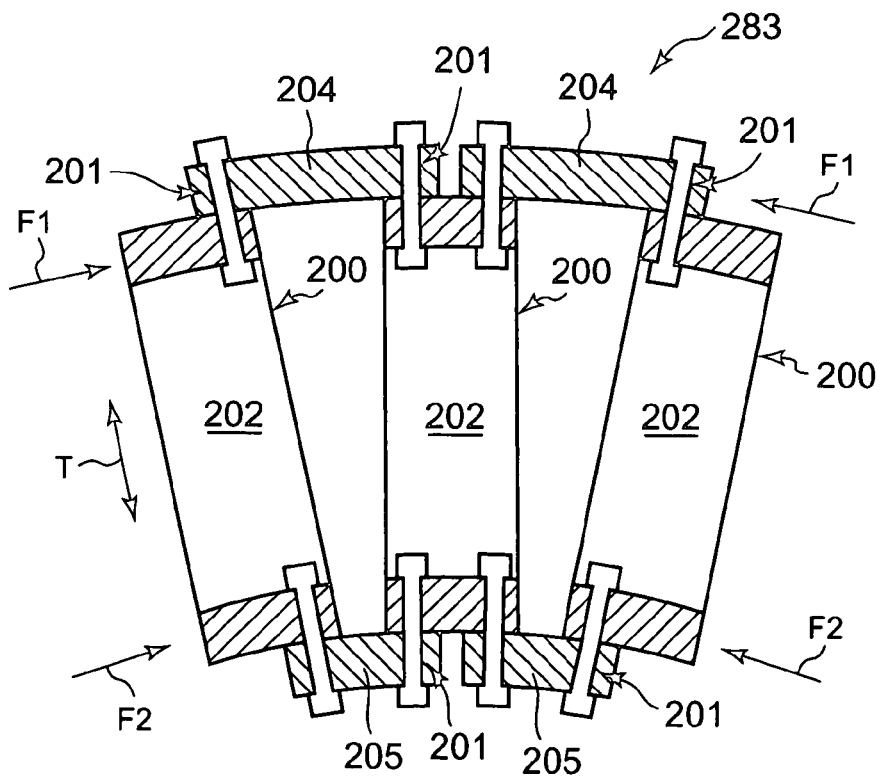
FIG. 11 is a schematic plan view of a deformable structure in a comparative example.

FIG. 11 is a schematic plan view of a deformable structure 283 in a comparative example. The deformable structure 283 includes turnable segments 200 respectively having base parts 202, and connecting members 201 connecting the turnable segments 200. The connecting members 201 are attached to the opposite ends of the base part 202 of each turnable segment 200 with respect to a first direction T. The adjacent turnable segments 200 are joined together with pins. Stopping members 204 and 205 that determine the radius of curvature of the deformable structure 283 are arranged on the opposite sides of the base parts 202 with respect to the first direction. The stopping parts 204 and 205 and the connecting members 201 are thus assembled.

When external deforming forces F1 and F2 are exerted on the deformable structure 283 to change the radius of curvature of the deformable structure 283 as shown in FIG. 11, the external deforming forces F1 and F2 act on the connecting members 201. Then, a shearing force resulting from the external deforming forces F1 and F2 acts on the connecting members 201. The connecting member 201 having a comparatively low structural strength is likely to break under such a shearing force.

As mentioned in connection with FIG. 10, a low force acts on the connecting parts 101 of the deformable structure 83 embodying the present invention. Therefore the strength of the deformable structure 83 is higher than that of the deformable structure 283 in comparative example. The same applies also to the stopping parts 129. The stopping parts 129 that limit the turning of the connecting parts 101 about the first axes Y are disposed at positions different from those of the connecting parts 101. Therefore, only a low external force acts on the stopping parts 129 even if an external force that can turn the connecting parts 101 about the first axes Y through an angle greater than the predetermined angle should act on the connecting parts 101. Thus the deformable structure 83 has a high strength.

The deformable structure 83 in this embodiment has a high strength. Thus the cable support system employing the deformable structure 83 can support a cable near the outer surface of a driving apparatus, such as a robot, regardless of the position thereof. Even if the deformable structure 83 or the cable is heavy or even if a high acceleration is imparted to the deformable structure 83, the deformable structure 83 can maintain a curved shape of the predetermined allowable radius of curvature.

In this embodiment, the stopping parts 104 and 105 are formed respectively at the extremities, with respect to the first directions T, of the base parts 102 extending on the opposite sides of the connecting part 101. When a force is exerted on the deformable structure 83 to change the radius of curvature of the deformable structure 83, forces act on both the stopping parts 104 and 105, which can further surely prevent the breakage of the connecting parts 101.

In this embodiment, one of the two adjacent connecting parts 101 arranged in the longitudinal direction S can turn about the second axis Z relative to the other connecting part 101 if the spacers 104 are not attached to the base parts 102 of the connecting parts 101. Thus the radius of curvature of the deformable structure 83 in a state where the spacer 104 attached to the base part 102 of one of the two adjacent connecting parts 101 is in contact with the base part 102 of the other connecting part 101 by adjusting the size of the spacer 104 and the position of the spacer 104 on the base part 102. Therefore, the radius of curvature of the deformable structure 83 can be changed without changing the dimensions of the connecting parts 101 and the base parts 102. Thus the connecting parts 101 and the base parts 102 can be generally used for forming deformable structures 83 capable of being curved respectively in different radii of curvature. Consequently, the manufacturing cost of the deformable structure can be reduced.

In this embodiment, the surface 123 of the spacer attached to one of the two adjacent base parts 102 facing the other base part 102 is a curved surface which is curved about the first axis Y in a fixed radius of curvature. Therefore, the distance from the point of contact of the spacer 104 with the other base part 102 to the first axis Y does not change when the base part 102 is turned about the first axis Y. One of the two adjacent connecting parts 101 can be smoothly turned about the first axis Y relative to the other connecting part 101 in a state where the spacer 104 attached to the base part 102 of one of the connecting part 101 is in contact with the base part 102 of the other connecting part 101. The spacer 104 may be any one of spherical members, cylindrical members and conical members.

In this embodiment, the spacer 104 attached to one of the two adjacent base parts 102 and the other base part 102 are in contact with each other on the opposite sides with respect to an imaginary plane containing the longitudinal axis X and the first axis Y. Thus one of the two adjacent connecting part 101 is restrained from turning about the longitudinal axis X relative to the other connecting part 101, that is, the former connecting part 101 is restrained from turning in the direction C about the longitudinal axis X. Therefore, a cable extended along the arrangement of the connecting parts 101 will not be twisted about the longitudinal axis X.

The wire 124 of the deformable structure 83 keeps the spacers 104 and the second stopping parts 105, namely, the inner shells, in direct or indirect contact with the adjacent base parts 102. Therefore, when the base parts 102 turn, the base parts 102 are restrained from separating from the stopping parts 104 and 105, and the undesired turning of one of the two adjacent base parts 102 relative to the other base part 102 can surely be prevented.

The turnable segments 100 can be connected by engaging the first joining part 107 with the second joining part 106. Thus the deformable structure 83 can be easily assembled without using other joining parts, such as pins. When any joining parts, such as pins are not used for connecting the turnable segments 100, the connecting parts 101 have a high strength.

Figure 12:
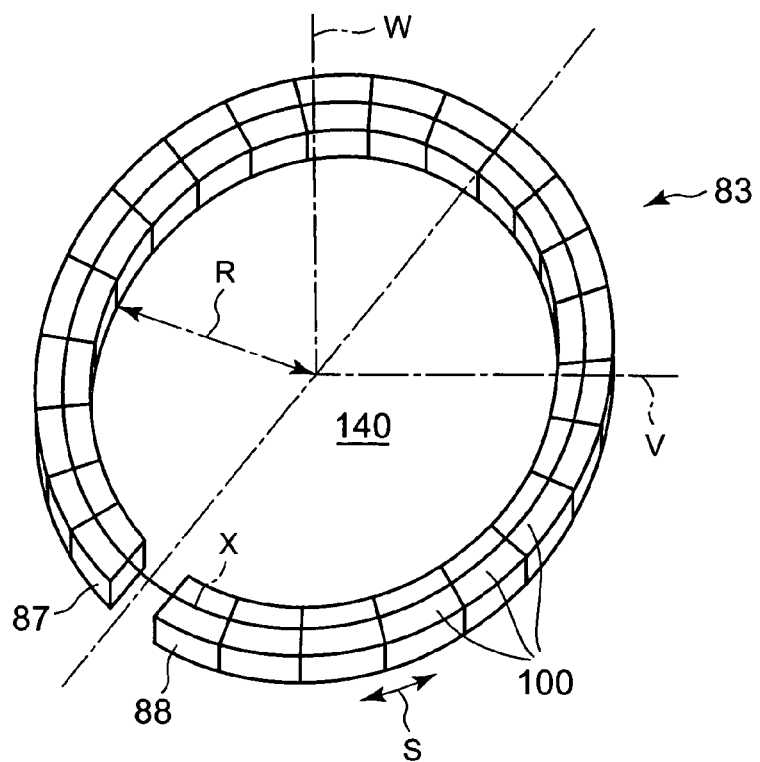
FIG. 12 is a schematic perspective view of the deformable structure shown in FIG. 1.
Figure 13:
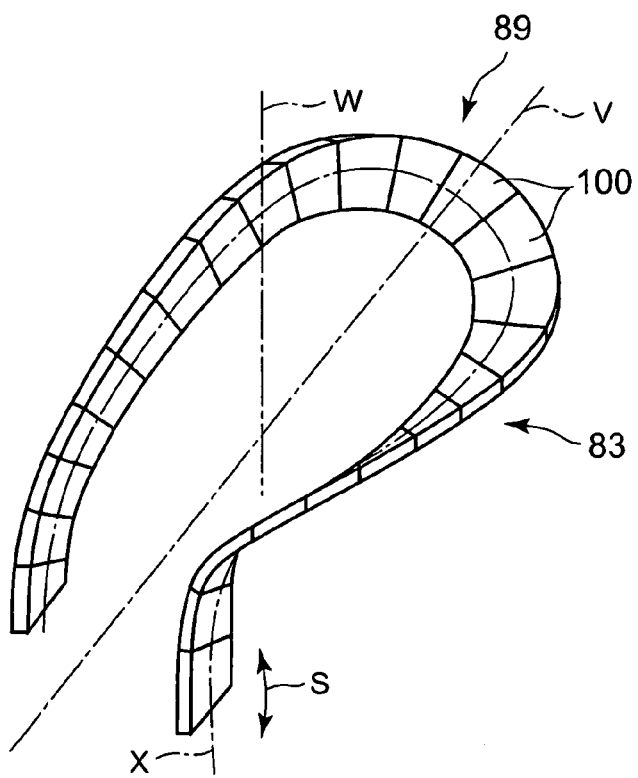
FIG. 13 is a perspective view of the deformable structure shown in FIG. 1 in a deformed shape.

FIG. 12 is a schematic perspective view of the deformable structure 83 and FIG. 13 is a perspective view of the deformed deformable structure 83. The deformable structure 83 formed by arranging the connecting parts 101 in the longitudinal direction S and connecting the adjacent connecting parts 101 can be deformed in a first deformed shape such that a straight line connecting the opposite ends 87 and 88 of the deformable structure 83 and a curve extending along the deformed deformable structure 83 are contained in an imaginary plane 140. When the deformable structure 83 is deformed in the first deformed shape, the deformable structure 83 has a shape substantially resembling a circular arc having its center on a vertical axis W perpendicular to the imaginary plane 140. The turnable segments 100 are arranged on a circle having its center on the vertical axis W. In the deformable structure 83 formed by connecting the turnable segments 100, the spacers 104 are on the radially outer side of the connecting parts 101. One of the two adjacent turnable segments 100 can turn about an axis V perpendicular to the vertical axis W relative to the other turnable segment 100. The axis V is set on each turnable segment 100 and coincides approximately with the first axis Y.

The deformable structure 83 can be curved in a second deformed shape by turning the connecting parts 101 of the deformable structure 83 relative to each other. When the deformable structure 83 is thus curved in the second deformed shape, a middle part 89 of the deformable structure 83 has shape substantially resembling a U-shape as shown in FIG. 13. A projective figure of the deformable structure 83 in the second deformed shape on a plane containing the axis V in the middle part 89 and the vertical axis W is substantially similar to the first deformed shape.

Figure 14:
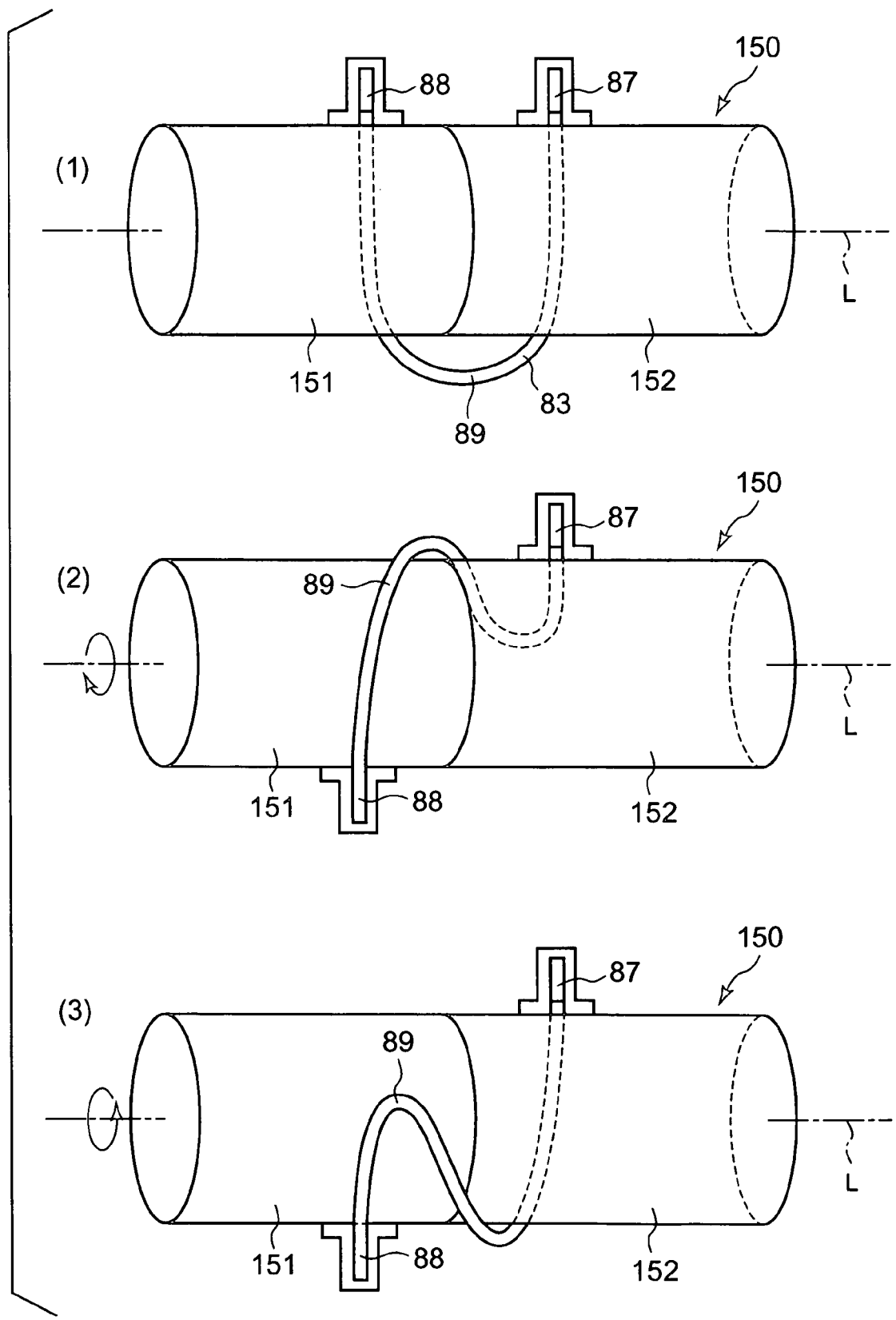
FIG. 14 is a typical view of the deformable structure shown in FIG. 1 in another deformed shape.

FIG. 14 is a typical view of the deformable structure 83 in another deformed shape. The deformable structure 83 is wound round a bar-shaped driving apparatus 150. The driving apparatus 150 includes a first driving unit 152 and a second driving unit 151 that can be turned about a predetermined axis L relative to the first driving unit 152. The deformable structure 83 fixed to the driving apparatus 150 so as to be deformable in the second deformed shape. More concretely, the opposite ends 87 and 88 of the deformable structure 83 are fixed to the first driving unit 152 and the second driving unit 151, respectively, so that the deformable structure 83 is curved along the outer surface of the driving apparatus 150. In this state, the turnable segments 100 arranged in the longitudinal direction S are restrained from turning about the axis L relative to the adjacent turnable segments 100 and are allowed to turn through a predetermined angle about axes perpendicular to the axis L.

FIG. 14(1) shows the deformable structure 83 wound round the driving apparatus 150 in the deformed shape shown in FIG. 13. As shown in FIG. 14(1), the opposite ends 87 and 88 of the deformable structure 83 disposed at similar positions with respect to the axis L. The deformable structure 83 extends from the end 87 in a first circumferential direction to the middle part 89 and extends from the middle part 89 in a second circumferential direction to the other end 88.

One of the two adjacent turnable segments 100 can turn about an axis perpendicular to the axis L relative to the other turnable segment 100. Therefore, the deformable structure 83 can deform about an axis perpendicular to the axis L. One of the two adjacent turnable segments 100 is restrained from turning about an axis parallel to the axis L relative to the other turnable segment 100. Therefore, the deformable structure 83 wound round the driving apparatus 150 is restrained from being radially away from the driving apparatus 150. Even if the axis L is horizontal, the deformable structure 83 is restrained from sagging down under its own weight. Therefore, the deformable structure 83 can be prevented from being away from the driving apparatus 150 without supporting the deformable structure 83 by any additional support members and the deformable structure 83 can remain closely extending along the driving apparatus 150.

The deformable structure 83 can remain closely extending along the driving apparatus 150 when the second driving unit 151 turns about the axis L relative to the first driving unit 152. FIG. 14(2) shows the deformable structure 83 in a state where the second driving unit 151 has turned in a first direction through an angle of 180° from a position shown in FIG. 14(1). FIG. 14(3) shows the deformable structure 83 in a state where the second driving unit 151 has turned in a second direction opposite the first direction through an angle of 180° from the position shown in FIG. 14(1). As shown in FIGS. 14(2) and 14(3), the deformable structure 83 is deformable about an axis perpendicular to the axis L. Therefore, the end 87 of the deformable structure 83 can turn about the axis L relative to the other end 88. When the second driving unit 151 turns through an angle relative to the first driving unit 152, the opposite ends 87 and 88 are displaced relative to each other. When the deformable structure 83 is thus deformed, the deformable structure 83 can be prevented from being away from the driving apparatus 150.

A cable passed through the deformable structure 83 can be prevented from being away from the driving apparatus 150 even if the cable becomes loose together with the deformable structure 83. The cable will not interfere with devices around the driving apparatus 150 and will not obstruct the operation of the driving apparatus 150. The cable will not be excessively tensioned and will not be damaged.

The deformable structure 83 is only an example and many changes are possible therein without departing from the scope of the present invention. For example, the spacers 104 may be formed integrally with the base parts 102, respectively, instead of being detachably attached to the base parts 104, respectively, to reduce the number of the component parts, to reduce the cost of the deformable structure 83, to simplify work for assembling the deformable structure 83 and to improve the strength of the deformable structure 83.

Although the spacer 104, namely, the first stopping part 104, and the inner shell 106, namely, the second stopping part 105, are kept in contact with the adjacent base part 102 in this embodiment, the first stopping part 104 and the second stopping part 105 do not need to be simultaneously in contact with the base part 102 when the deformable structure 83 is allowed to turn through a predetermined angle about the second axis Z, that is, gaps may be formed between the first stopping part 104 and the adjacent base part 102 and between the second stopping part and the adjacent base part 102. When the deformable structure 83 is thus allowed to turn about the second axis Z, the deformable structure 83 can be more smoothly deformed. Even if the deformable structure 83 can turn about the second axis Z, the stopping parts 104 and 105 restrain the deformable structure 83 from being curved in a radius of curvature smaller than the allowable radius of curvature.

In this embodiment, the inner shells 126 serve as the second stopping parts 105. Additional second spacers may be attached to the base parts 102 to use the second spacers as the second stopping parts 105. In this embodiment, the stopping parts 104 and 105 are disposed on the opposite sides, respectively with respect to the first direction T. Only the stopping part 104 may be disposed only on the side of the first direction T1 with respect to the connecting part 101 depending on the use of the deformable structure. In this case, the deformable structure is also restrained from being curved in a circumferential direction about the second axis Z in a radius of curvature smaller than the allowable radius of curvature. In this embodiment, the stopping parts 104 and 105 protrude in the first longitudinal direction S1 from each base part 102. At least either of the stopping parts 104 and 105 may protrude in the second longitudinal direction S2. The stopping parts 104 and 105 may protrude in the opposite longitudinal directions S1 and S2, respectively, from the base part 102. In this case, base parts 102 provided with the stopping parts 104 and 105 and base parts 102 not provided with any stopping parts may be used.

In this embodiment, the covers 103 extending around the longitudinal axis X hold a cable. A cable may be held by other holding members. For example, a cable may be held on the base parts 102 by clamping members.

In this embodiment, the two adjacent connecting parts 101 are connected by a ball joint. The two adjacent connecting parts 101 may be connected by any other suitable connecting mechanism, such as a universal joint. The connecting part 101 does not need to turn about the second axis Z when the spacer 104 is fixed to the base part 102. Therefore, the two adjacent connecting parts 101 may be connected by a simple connecting mechanism using, for example, a pin.

Figure 15:
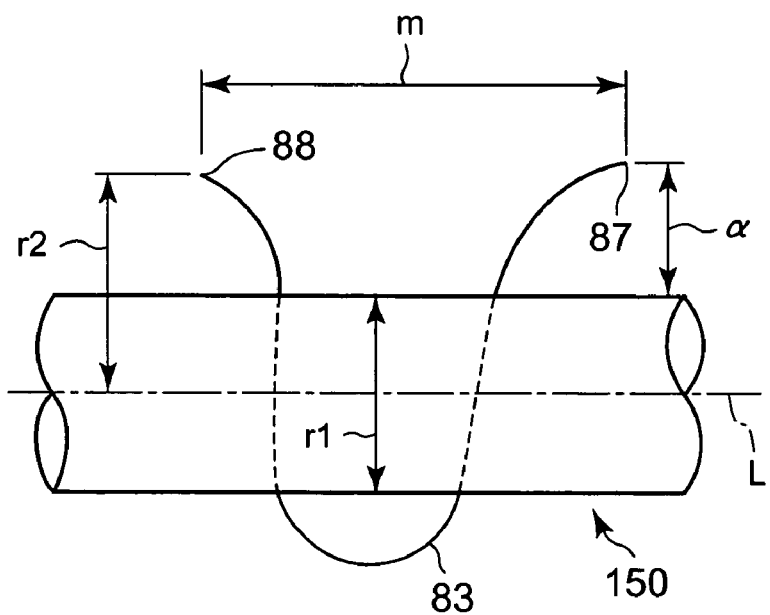
FIG. 15 is a view of assistance in explaining the dimensions of the deformable structure shown in FIG. 1 as combined with a driving apparatus.

FIG. 15 is a view of assistance in explaining the dimensions of the deformable structure 83 as combined with the driving apparatus 150. The driving apparatus 150 has a rotational radius r1. The deformable structure 83 as shown in FIG. 9 has an allowable radius r2 of curvature determined by the spacers 104. The deformable structure 83 as shown in FIG. 7(2) has a minimum radius r3 of curvature with respect to the second direction U determined by the stopping parts 129.

The allowable radius r2 of curvature with respect to the first direction T of the deformable structure 83 is equal to r1+α, where α is the thickness of a space between the deformable structure 83 and the driving apparatus 150. The deformable structure 83 can be disposed close to the driving apparatus 150 such that the deformable structure 83 is spaced a distance α apart from the driving apparatus 150. The distance along the axis L between the opposite ends 87 and 88 of the deformable structure 83 is m=2×r3. The distance m is determined such that the opposite ends 87 and 88 can be spaced the distance m apart from each other along the axis L under a limited deformation limited by the stopping parts 129. Thus the deformable structure 83 can be naturally deformed.

In this embodiment, the deformable structure 83 is combined with the driving apparatus 150 such that the distance m along the axis L is 300 mm. The allowable radius r2 of curvature with respect to the first direction T of the deformable structure 83 is 150 mm. The minimum radius 43 of curvature with respect to the second direction U determined by the stopping parts 129 is 150 mm.

Although the deformable structure 83 has been described on an assumption that the deformable structure 83 is curved in a circular arc, the angular distance between the opposite ends 87 and 88 may be any angle not greater than 360° or may be any angle not smaller than 360°. When the deformable structure 83 is removed from the driving apparatus 150 and is deformed in a first deformed shape in an imaginary plane containing a straight line extending between the opposite ends 87 and 88 and a curve extending in the longitudinal direction of the deformable structure 83, the deformable structure 83 may be curved in a circular arc contained in the imaginary plane and having its center on a vertical axis W perpendicular to the imaginary plane and having a central angle not greater than 360°.

The deformable structure 83 removed from the driving apparatus 150 may be a coil having a number of turns wound round a predetermined center axis. The deformable structure 83 is turned through an angle exceeding 360° to form a plurality of turns between the opposite ends 87 and 88. The deformable structure 83 removed from the driving apparatus 150 can be wound in a coil. A part of the deformable structure 83 between the opposite ends 87 and 88 is turned about an axis through an angle of 440°. When the angular distance between the opposite ends 87 and 88 is not smaller than 360°, the deformable structure 83 can be deformed as the second driving unit 39 turns relative to the first driving unit 140 even if the second driving unit 39 turns relative to the first driving unit 40 in a large angular range. When the deformable structure 83 is deformed in a helical shape, the deformable structure 83 can turn together with the second driving unit 139 when the second driving unit 139 is turned relative to the first driving unit 140 in an angular range of ±240°.

Figure 16:
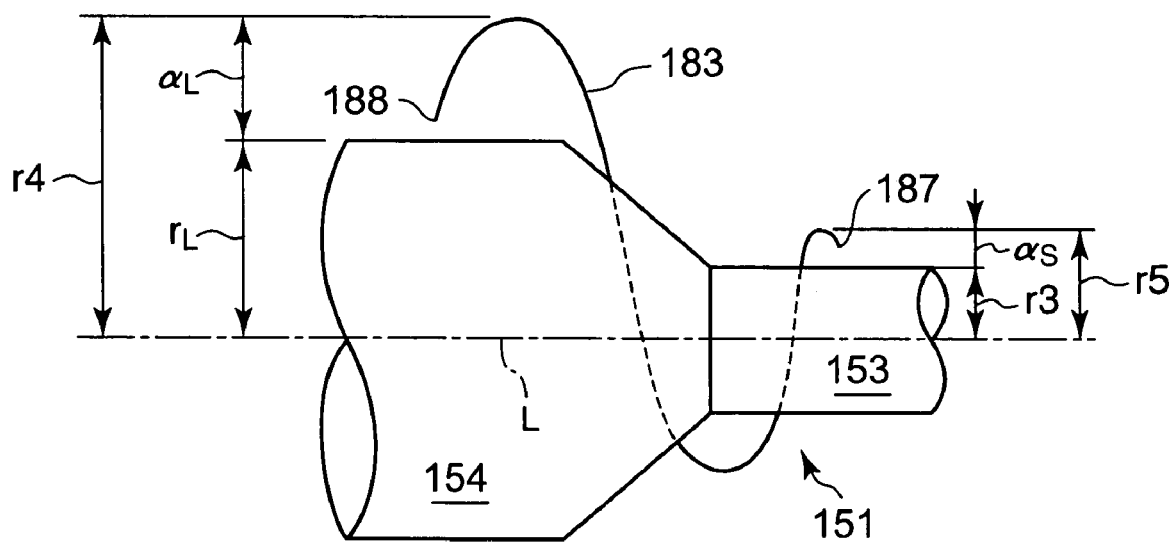
FIG. 16 is a typical view of a deformable structure in a second embodiment according to the present invention as combined with a driving apparatus.
Figure 17:
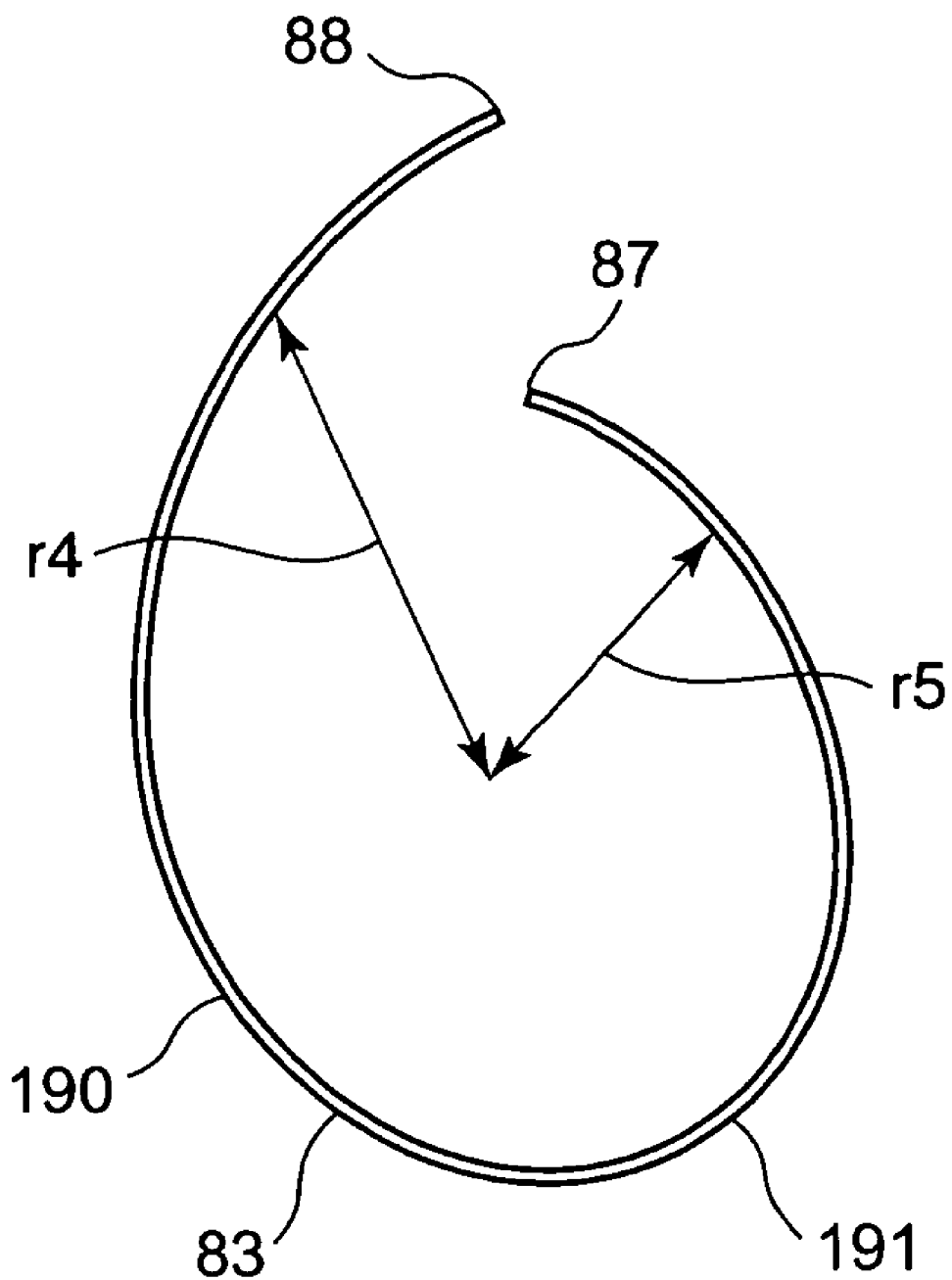
FIG. 17 is a view of assistance in explaining the radii of curvature of the deformable structure of the present invention.

FIG. 16 is a typical view of a deformable structure 183 in another embodiment according to the present invention as combined with a driving apparatus 151 and FIG. 17 is a view of assistance in explaining the radii of curvature of the deformable structure 183. The deformable structure 183 in this embodiment is similar in shape to the deformable structure 83 in the aforementioned embodiment shown in FIG. 1 and has an allowable radius of curvature different from that of the deformable structure 83 in the aforementioned embodiment. Description of parts of the deformable structure 183 like or corresponding to those of the deformable structure 83 will be omitted.

The deformable structure 183 in this embodiment includes base parts 102 respectively provided with spacers 104 respectively having different sizes. A first part 190 and a second part 191 of the deformable structure 183 are curved in a big radius of curvature and a small radius of curvature, respectively. The first part 190 and the second part 191 are continuous. The spacers 104 attached to the base parts 102 of the first part 190 of the deformable structure 183 are large, so that the first part 190 can be curved in a big radius of curvature. The spacers 104 attached to the base parts 102 of the second part 191 of the deformable structure 183 are small, so that the second part 191 can be curved in a small radius of curvature.

The deformable structure 183 having the first part 190 and the second part 191 capable of being curved in different radii of curvature, respectively, and continuously extended in a longitudinal direction S is wound round the driving apparatus 151 not having a uniform diameter. The driving apparatus 151 shown in FIG. 16 has longitudinal parts respectively having different diameters and longitudinally arranged between the opposite ends 187 and 188 or the deformable structure 183. The first part 190 and the second part 191 of the deformable structure 183 are wound round a large part 154 of a big diameter and a small pat 153 of a small diameter, respectively, of the driving apparatus 151. More concretely, the radius r4 of curvature of the first part 190 is equal to the sum of the radius rL of the large part 154 of the driving apparatus 151 and a predetermined first gap size αL and the radius r5 of curvature of the second part 191 is equal to the sum of the radius r3 of the small part 153 of the driving apparatus 151 and a predetermined second gap size αS. Thus the deformable structure 183 can be prevented from being excessively away from the surface of the driving apparatus 151 even though the driving apparatus 151 does not have a uniform diameter.

The spacers 104 are detachably attached to the base parts 102. The radius of curvature of a curve in which the deformable structure 183 can be curved can be changed by attaching spacers 104 of different sizes to the base parts 102. Thus the same connecting parts 101 and the same base parts 102 can be used for forming deformable structures for use in combination with driving apparatuses 150 respectively having different diameters. Therefore, the connecting parts 101 and the base parts 102 can be used for forming a variety of deformable structures.

Figure 18:
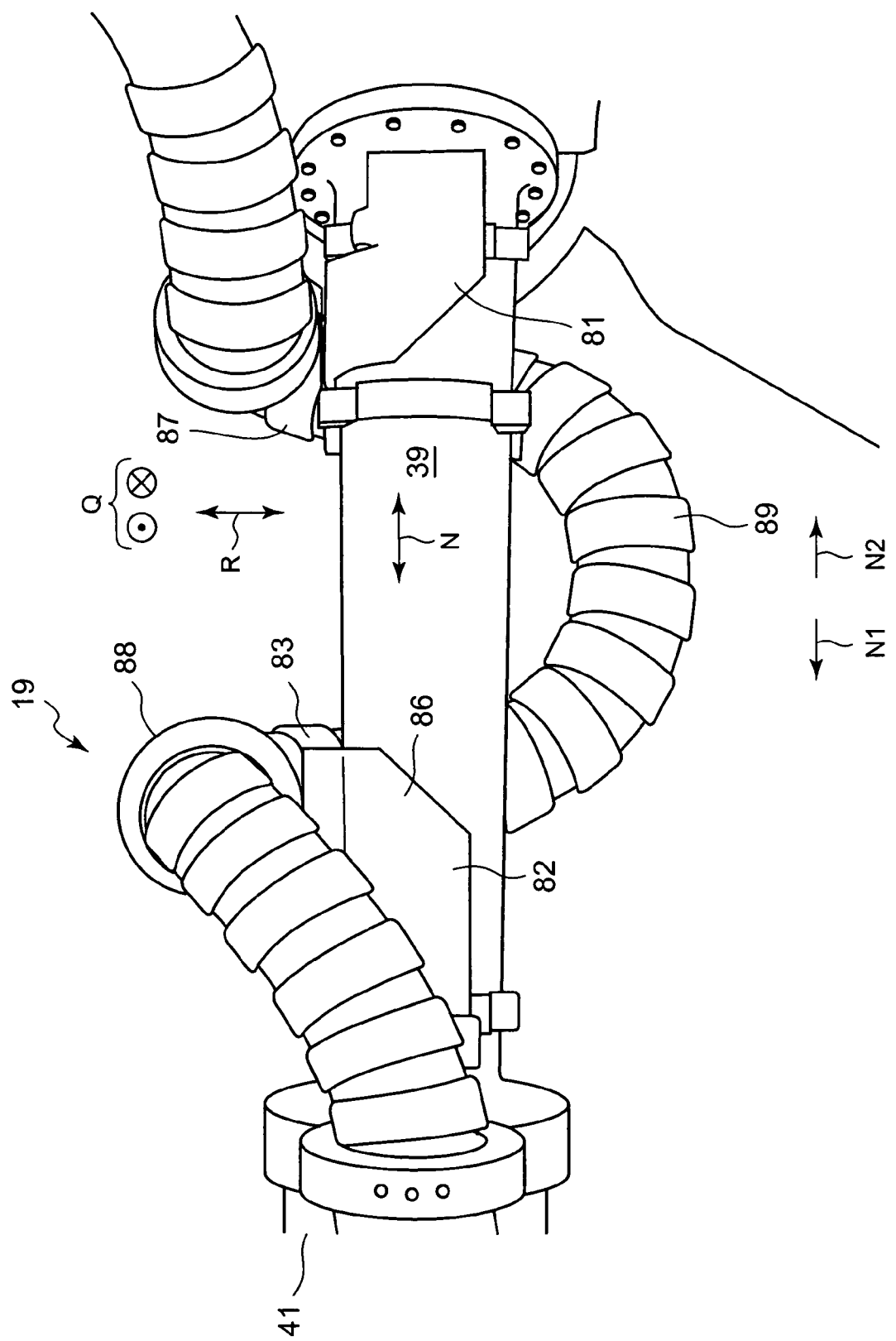
FIG. 18 is a front elevation of a cable support system in a third embodiment according to the present invention as combined with an industrial robot.
Figure 19:
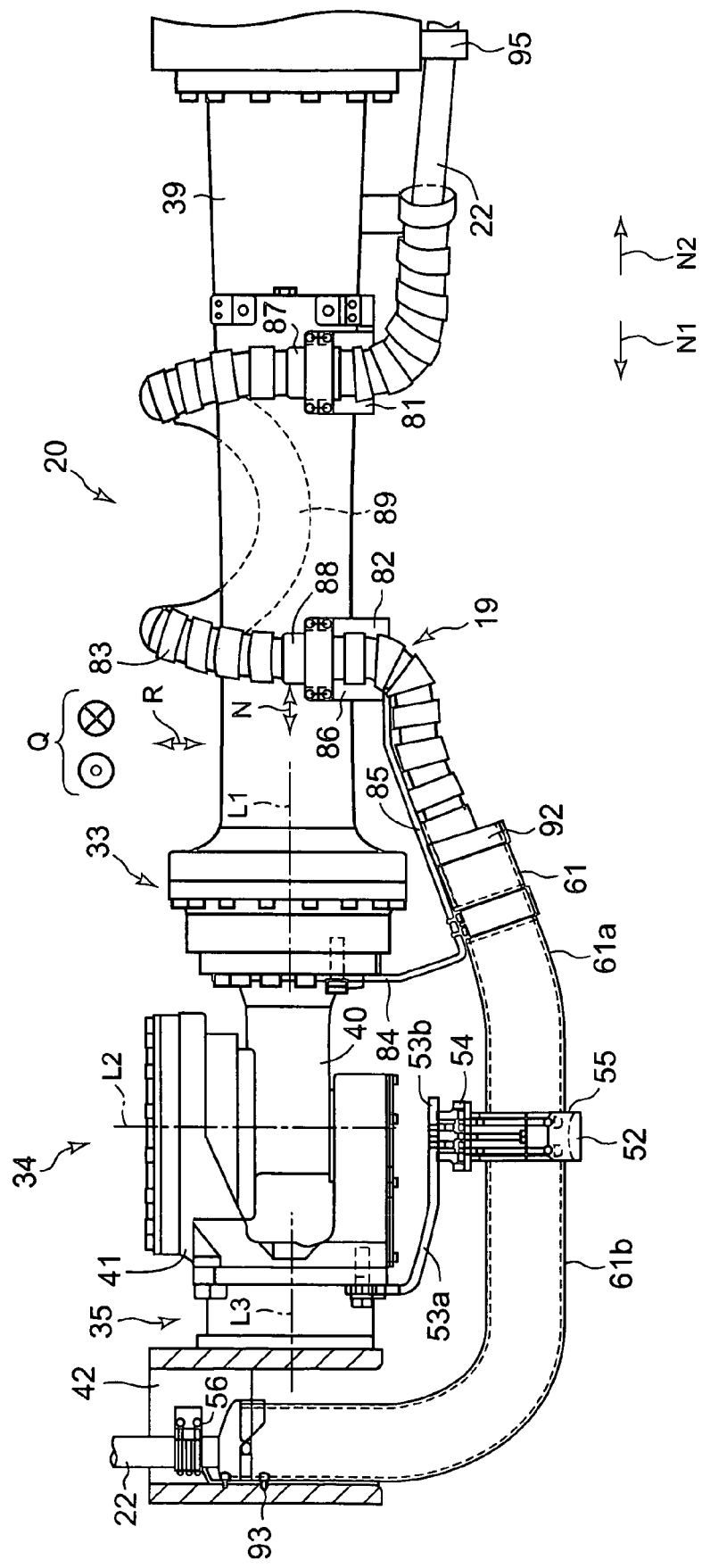
FIG. 19 is fragmentary front elevation of the industrial robot.
Figure 20:
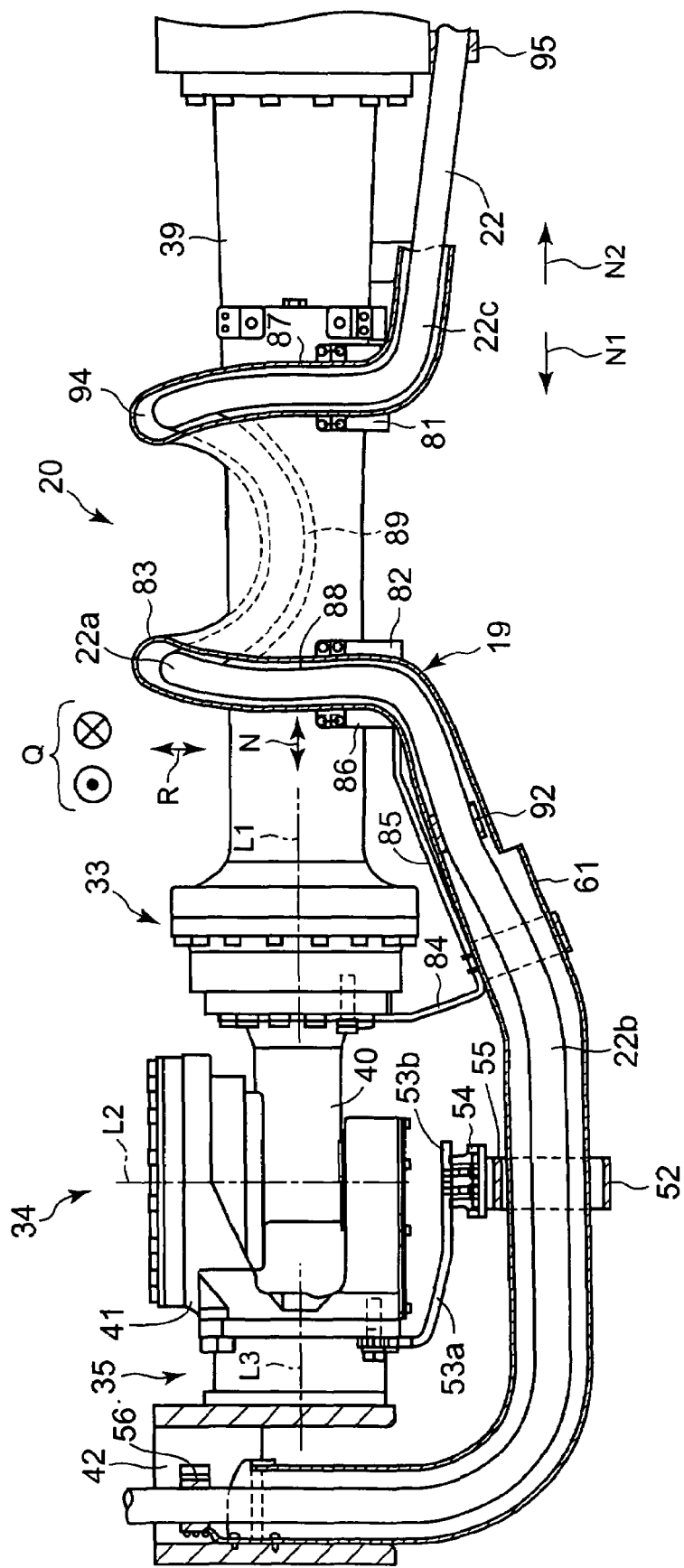
FIG. 20 is a partly cutaway front elevation of the industrial robot.
Figure 21:
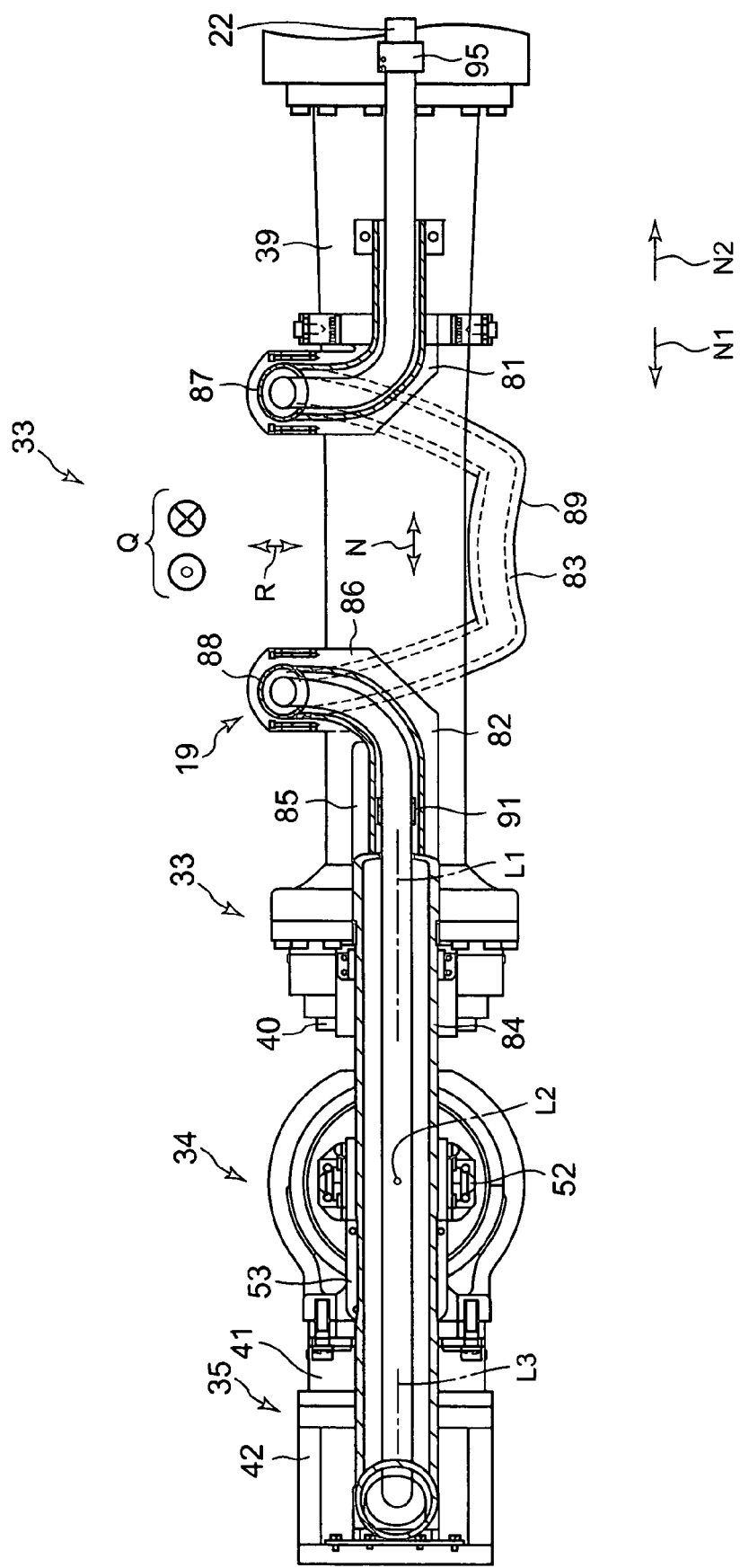
FIG. 21 is a fragmentary side elevation of the industrial robot.

FIG. 18 is a front elevation of a cable support system 19 in an embodiment according to the present invention to be used on an industrial robot 20. The cable support system 19 includes the foregoing deformable structure 83. FIG. 19 is a fragmentary front elevation of the industrial robot 20, FIG. 20 is a partly sectional front elevation of the industrial robot 20 and FIG. 21 is a fragmentary side elevation of the industrial robot 20.

The industrial robot 20 is a six-axis vertical articulated robot for spot welding. The industrial robot 20 has a plurality of turning members connected by joints so as to be turnable relative to each other. A welding gun is attached to the extremity of the industrial robot 20. The movable members of the industrial robot 20 are turned properly relative to each other to locate the welding gun at predetermined welding positions for spot welding. The welding gun is an end effector attached to the extremity of the industrial robot 20.

The robot 20 is provided with a cable 22. Peripheral devices including a welding power supply for supplying a welding current to the welding gun, a driving power supply for supplying power for driving the welding gun 21, a robot controller for supplying control signals for controlling the operation of the welding gun 21 and a cooling water pump for pumping cooling water for cooling the welding gun are connected to the welding gun by the cable 22. Thus the cable 22 is a bundle of wiring lines for supplying power and signals to the welding gun 21 and pipes for carrying a gas and a liquid to the welding gun 21. The cable 22 is an elongate, flexible member capable of deforming according to the turning motions of the turning members of the robot 20.

The robot 20 is a driving apparatus at least including a first driving unit 39 and a second driving unit 40 capable of turning about a predetermined axis L1 relative to the first driving unit 39. The robot 20 includes a drive system for driving the second driving unit for turning about the axis L1 relative to the first driving unit 39, and a robot controller for controlling the drive system. The robot controller gives control signals to the drive system to make the drive system drive the second driving unit 40 about the axis L1 relative to the first driving unit 39. The robot 20 includes also a cable support system 19 supporting a cable along the first driving unit 39 and a second driving unit 40.

A direction parallel to the axis L1 is called an axial direction N, directions about the axis L1 are circumferential directions Q, and directions toward and away from the axis L1 in a plane perpendicular to the axis L1 are radial directions R. A direction from the first driving unit 39 toward the second driving unit 40 is a first axial direction N1 and a direction from the second driving unit 40 toward the first driving unit 39 is a second axial direction N2.

The first driving unit 39 and the second driving unit 40 are substantially cylindrical and have a common axis aligned with the axis L1. The first driving unit 39 and the second driving unit 40 are connected by a joint 33. The first driving unit 39 and the second driving unit 40 connected by the joint 33 can turn relative to each other about the axis L1. The drive system drives the second driving unit 40 about the axis L1 relative to the first driving unit 39. The drive system is, for example, a servomotor built into the first driving unit 39 or the second driving unit 40.

The cable support system 19 includes a first fixing part 81 fixed to the first driving unit 39, a second fixing part 82 fixed to the second driving unit 40 and the deformable structure 83 supporting the cable 22. The first fixing part 81 is fixed directly or indirectly to the first driving unit 39 and protrudes from the first driving unit 39 in the radial direction R. The second fixing part 82 is disposed nearer to the second driving unit 40 than the first fixing part 81 and is spaced from the first fixing part 81 in the axial direction N.

The second fixing part 82 has a second part 84 on the side of the second driving unit 40, a connecting part 85, and a first part 86 on the side of the first driving unit 39. The second part 84 is fixed directly or indirectly to a part of the second driving unit 40 near the first driving unit 39 and protrudes from the second driving unit 40 in the radial direction R. The connecting part 85 connects the first part 86 and the second part 84. The connecting part 86 extends from the second part 84 in the axial direction N and is spaced in the radial direction R from the outer surfaces of the second driving unit 40 and the first driving unit 29. The first part 86 is disposed opposite to the first driving unit 39 at a distance from the outer surface of the first driving unit 39. The first part 86 is nearer to the second driving unit 40 than the first fixing part 81. Since the second fixing part 82 is away in the radial direction R from the first driving unit 39, the second fixing part 82 is prevented from coming into contact with the first driving unit 39.

When the second driving unit 40 is turned about the axis L1 relative to the first driving unit 39, the second fixing part 82 does not touch the first driving unit 39 and turns about the axis L1 together with the second driving unit 40. The first fixing part 81 remains stationary together with the first driving unit 39 when the second driving unit 40 is turned relative to the first driving unit 39. Thus the first fixing part 81 and the second fixing part 82 are displaced relative to each other in the circumferential direction Q when the second driving unit 40 is turned.

The deformable structure 83 is formed in an elongate, cylindrical shape and has opposite ends, namely, a first end 87 and a second end 88. The first end 87 and the second end 88 are fixed to the first fixing part 81 and the first part 86 of the second fixing part 82, respectively. The opposite ends 87 and 88 of the deformable structure 83 are fixedly held by the fixing parts 81 and 82, respectively, and are spaced in the radial direction R from the first driving unit 39. The opposite ends 87 and 88 are fixedly held by the fixing parts 81 and 82 at positions spaced from each other in the axial direction N, respectively. The first end 87 of the deformable structure 83 extends from the first fixing part 81 in the circumferential direction Q in an imaginary plane perpendicular to the axis L1. The second end 88 of the deformable structure 83 extends from the first part 86 of the second fixing part 86 in the circumferential direction Q in an imaginary plane perpendicular to the axis L1.

The deformable structure 83 having the opposite ends 87 and 88 respectively fixed to the fixing parts 81 and 82 extends in a curve along the outer surface of the first driving unit 39 and the axial direction N. More concretely, the deformable structure 83 extends obliquely from the first end 87 in the first axial direction N1 and one of the opposite circumferential directions Q and then extends in the other circumferential direction Q toward the second end 88. The deformable structure 83 is curved substantially in a U-shape about the axis L1.

For example, in a state where the first fixing part 81 and the first part 86 of the second fixing part are at the same angular positions with respect to the circumferential direction Q as shown in FIG. 18, a part of the deformable structure 83 between the first end 87 and a middle part 89 extends in the axial direction N and one of the opposite circumferential directions Q and a part of the deformable structure 83 between the middle part 89 and the second end 88 extends in the axial direction N and the other circumferential direction Q.

As shown in FIG. 20, the deformable structure 83 is substantially cylindrical and defines an internal space 94 for loosely receiving the cable 22. The internal space 94 extends longitudinally through the deformable structure 83 and has a diameter greater than the outside diameter of the cable 22. The cable 22 is passed through the internal space 94 of the deformable structure 83 and is supported by the deformable structure 83. The cable 22 has a middle part 22a extended in the deformable structure 83, a first end part 22b extending in the first axial direction N1 from the middle part 22a, and a second end part 22c extending in the second axial direction N2 from the middle part 22a The first end part 22b of the cable 22 is fixedly held by a third fixing part 91 on the second driving unit 40 or a part nearer to the free end than the second driving unit 40. The second end part 22c of the cable 22 is fixedly held by a fourth fixing part 95 on the first driving unit 39 or a part nearer to the base end than the first driving unit 39.

Figure 22:
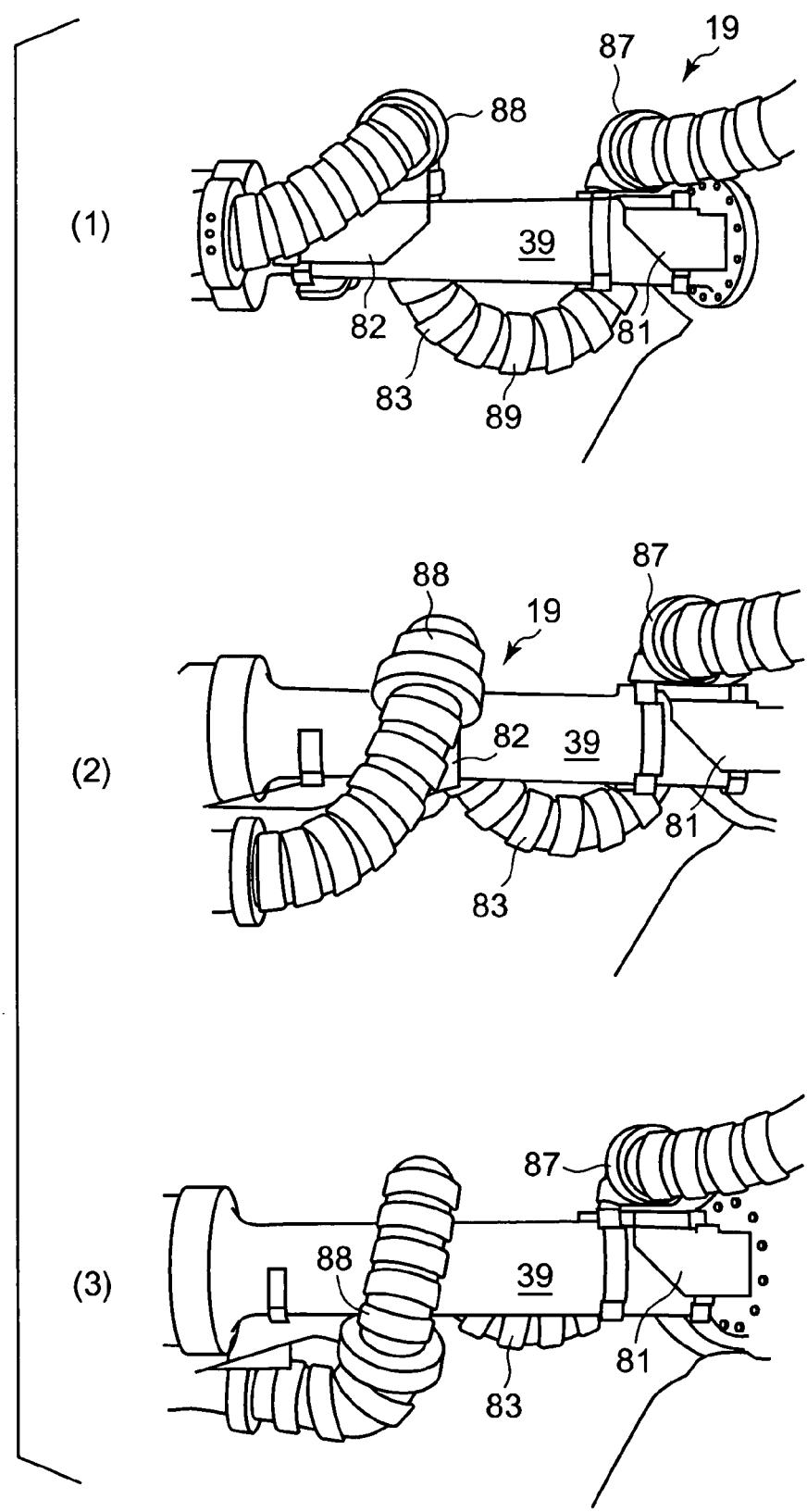
FIG. 22 is a view of assistance in explaining a mode of supporting a cable by the cable support system.
Figure 23:
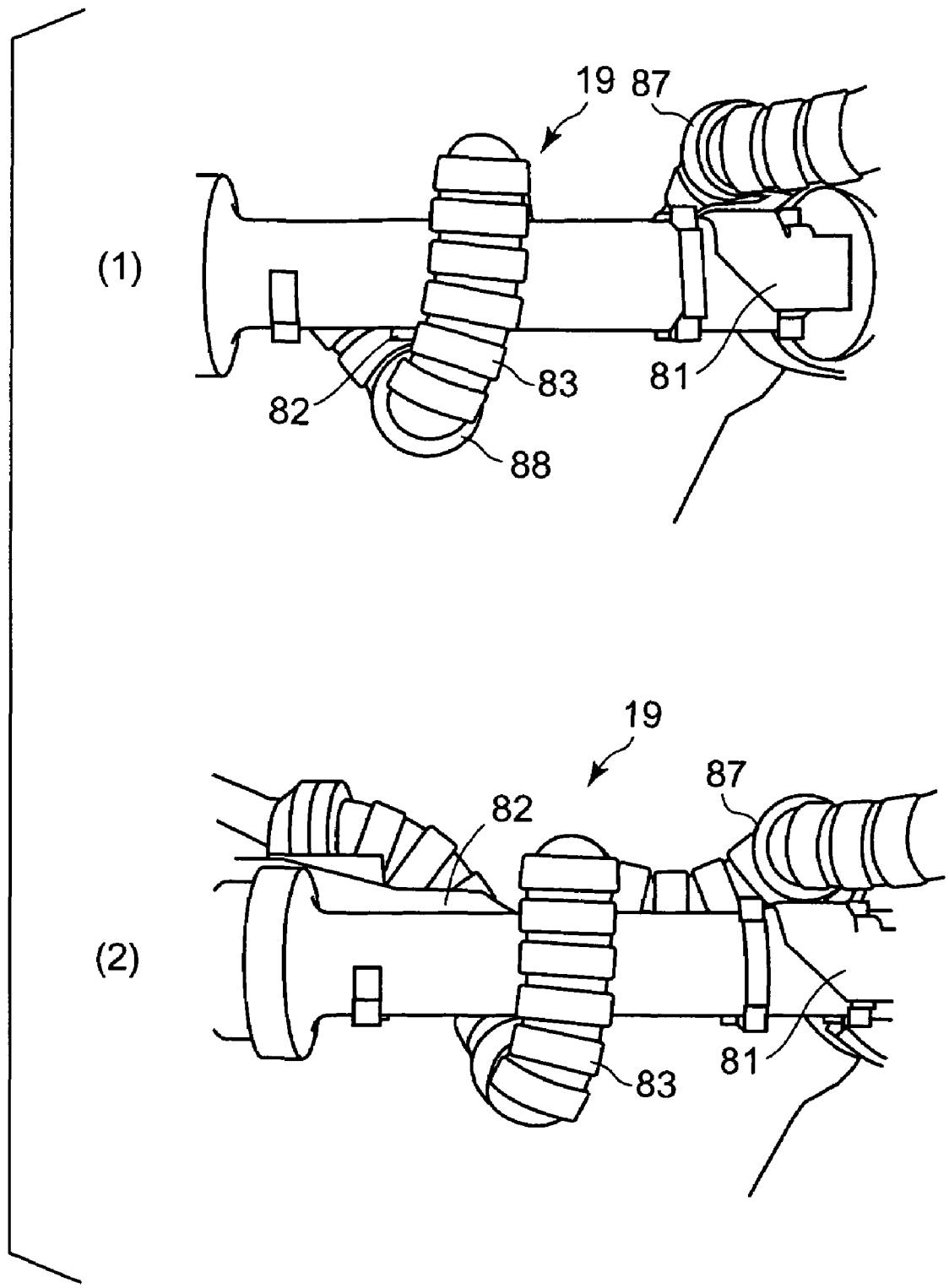
FIG. 23 is a view of assistance in explaining a mode of supporting a cable by the cable support system.
Figure 24:
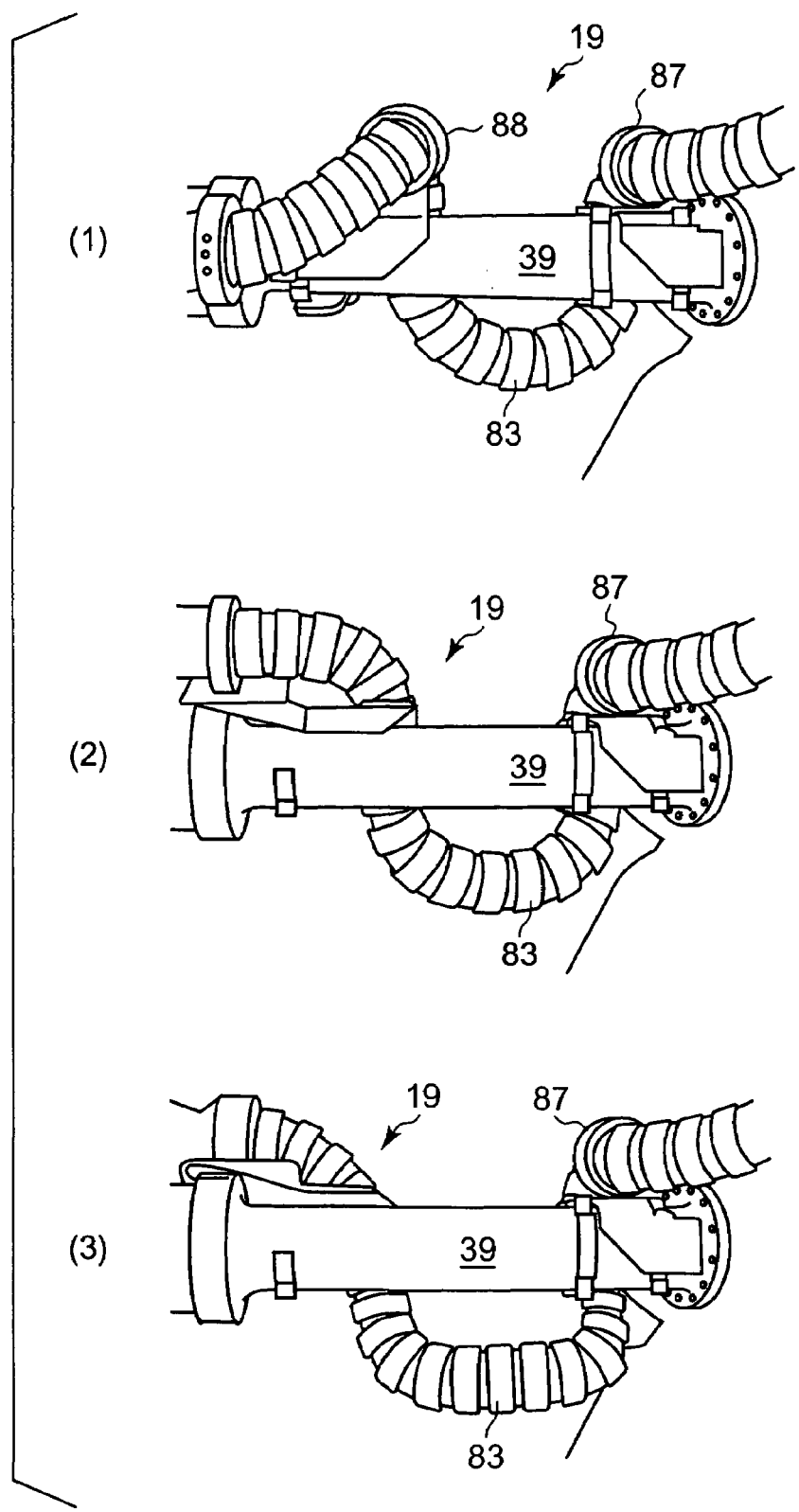
FIG. 24 is a view of assistance in explaining a mode of supporting a cable by the cable support system.
Figure 25:
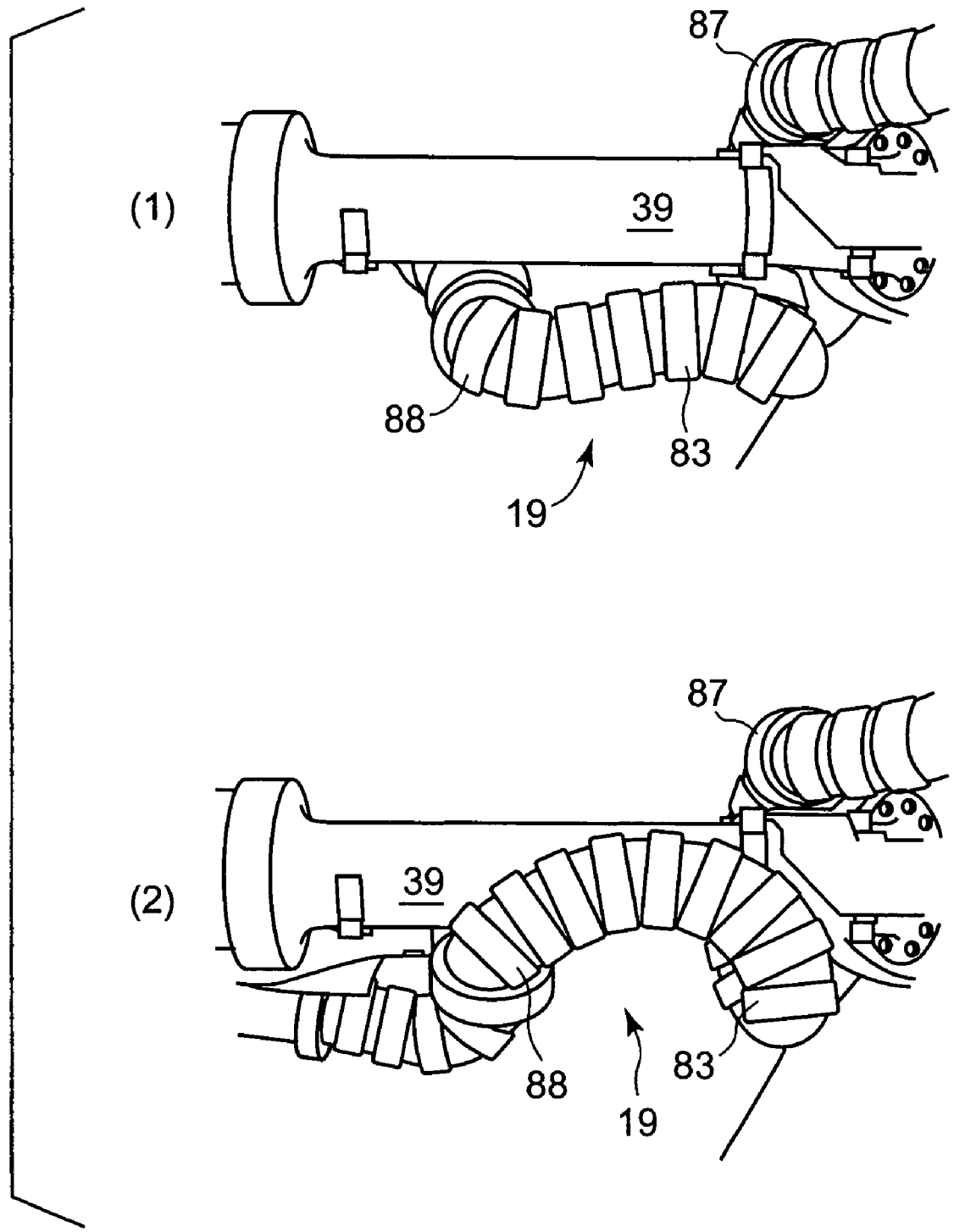
FIG. 25 is a view of assistance in explaining a mode of supporting a cable by the cable support system.

FIGS. 22 to 25 are views of assistance in explaining a mode of supporting the cable 22 by the cable support system 19. FIGS. 22(1) to 22(3) and FIGS. 23(1) and 23(2) show sequential changes in the shape of the cable support system 19 when the second driving unit 40 is turned in the first circumferential direction Q. FIGS. 24(1) to 24(3) and FIGS. 25(1) and 25(2) show sequential changes in the shape of the cable support system 19 when the second driving unit 40 is turned in the second circumferential direction Q.

As the circumferential positional relation between the first fixing part 81 and the second fixing part 82 changes, the deformable structure 83 is deformed such that the first end 87 and the second end 88 of the deformable structure 83 are displaced relative to each other with respect to the circumferential direction. Even though the deformable structure 83 is thus deformed, the deformable structure 83 can be prevented from being away from the first driving unit 39.

Even if the cable 22 supported by the deformable structure 83 loosens together with the deformable structure 83, the cable 22 can be prevented from being away from the first driving unit 39. The interference of the cable 22 with the peripheral devices and obstruction of the operation of the first driving unit 39 by the cable 22 can be prevented. The cable 22 can be prevented from being excessively tensioned and being damaged.

The cable 22 loosely extended through the deformable structure 83 is prevented from being away from the deformable structure 83 in directions perpendicular to the axial direction S. Thus the cable 22 can be restrained from being away from the first driving unit 39 and the obstruction of the operation of the robot 20 by the cable 22 can be surely avoided. The cable 22 is movable in the axial direction S relative to the deformable structure 83. Consequently, the concentration of a force on a part of the cable 22 can be avoided when the second driving unit 40 is turned relative to the first driving unit 39 and hence the life of the cable 22 can be extended.

When the second driving unit 40 is turned relative to the first driving unit 39, the cable 22 can be held by the substantially entire inside surface of the deformable structure 83 and hence the cable 22 can be surely held by the deformable structure 83 and the concentration of a force on a part of the cable 22 can be surely avoided. The cable 22 deforms according to the deformation of the deformable structure 83. Therefore, the radius of curvature of the cable 22 is approximately equal to that of the deformable structure 83 and hence the cable 22 will not be curved in an excessively small radius of curvature.

The maximum angular distance about the axis L between the first end 87 and the second end 88 can be increased by lengthening the deformable structure 83 in the circumferential direction about the axis L. Thus, the angular range in which the second driving unit 40 can be turned relative to the first driving unit 39 can be widened. Since the deformable structure 83 is extended in the circumferential direction about the axis L, interference between the deformable structure 83 and the peripheral devices when the robot operates can be prevented.

The radius of curvature of the deformable structure 83 in a first deformed shape is greater than the radius of the first driving unit 39. If the radius of curvature of the deformable structure 83 is excessively smaller than the radius of the first driving unit 39, the deformable structure 83 is likely to come into contact with the robot. Since the radius of curvature of the deformable structure 83 is greater than the radius of the first driving unit 39, contact between the deformable structure 83 and the robot can be avoided. Preferably, the radius of curvature of the deformable structure 83 is within a predetermined range relative to the radius of the first driving unit 39 so that the deformable structure 83 is disposed as close to the first driving unit 39 as possible, which is effective in reducing the size of the support system 19.

Figure 26:
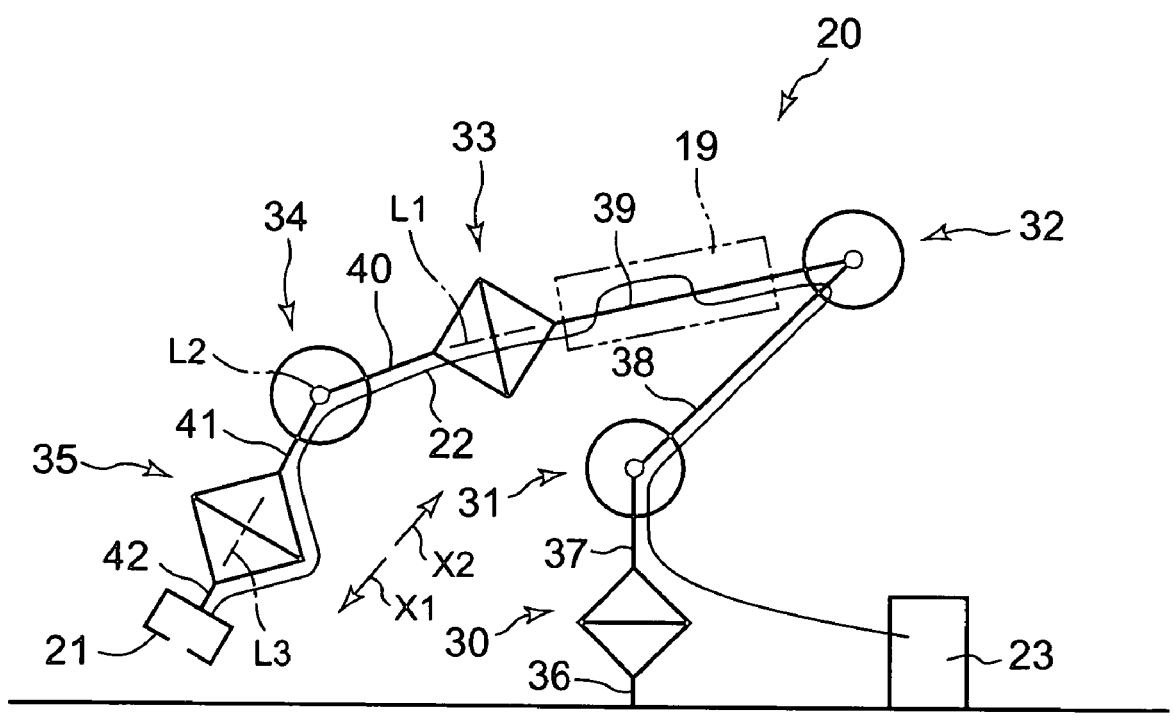
FIG. 26 is a diagrammatic view of an industrial robot.

FIG. 26 is a diagrammatic view of the industrial robot 20. The industrial robot 20 has three joints 30, 31 and 32 mainly for locating a welding gun 21 in a three-dimensional space, and three wrist joints 33, 34 and 35 mainly for determining the attitude of the welding gun 21. Robot arms 37 to 42 are connected by the joints 30 to 35.

More specifically, the industrial robot 20 includes a base 36, a first joint 30, a first arm 37, a second joint 31, a second arm 38, a third joint 32 and a third arm 39. The base 36 is fixedly installed at a predetermined fixed position. The first arm 37 is connected to the base 36 by the first joint 30. The second arm 38 is connected to the first arm 37 by the second joint 31. The third arm 39 is connected to the second arm 38 by the third joint 32. The first arm 37 turns on the first joint 30 about a first axis. The first axis is, for example, a vertical axis set on the base 36. The second arm 38 turns on the second joint 31 about a second axis set on the first arm 37. The second axis intersects the first axis perpendicularly. The third arm turns on the third joint 32 about a third axis set on the second arm 38. The third axis is parallel to the second axis.

The industrial robot 20 has a first wrist joint 33, a first wrist member 40, a second wrist joint 34, a second wrist member 41, a third wrist joint 35 and a third wrist member 42. The first wrist member 40 is connected to the third arm 39 by the first wrist joint 33. The second wrist member 41 is connected to the first wrist member 40 by the second wrist joint 33. The third wrist member 42 is connected to the second wrist member 41 by the third wrist joint 35.

The first wrist member 40 is turnable on the first wrist joint 33 about a first wrist axis L1 set on the third arm 39. The first wrist axis L1 is aligned with the third arm 39 and is perpendicular to a third arm axis. The second wrist member 41 is turnable on the second wrist joint 34 about a second wrist axis L2 set on the first wrist member 40. The second wrist axis L2 intersects the first wrist axis L1 perpendicularly.

The third wrist member 42 is turnable on the third wrist joint 35 about a third wrist axis L3 set on the second wrist member 41. The third wrist axis L3 is perpendicular to the second wrist axis L2. The first wrist axis L1, the second wrist axis L2 and the third wrist axis L3 meet at a single point. The welding gun 21 is attached to the third wrist member 42.

The arms 37 to 39 and the wrist members 40 to 42 are the movable members of the robot 20. Driving devices drive the arms 37 to 29 and the wrist members 40 to 42 for turning about the axes to set the welding gun 21 in a desired attitude at a desired position. Turning of those members includes turning through angles not smaller than 360°. In some cases, a direction along the movable members toward the welding gun 21 will be called a forward direction X1 and a direction along the movable members toward the base 36 will be called a backward direction S2.

A cable 22 for connecting the welding gun 21 to a peripheral device 23 extends along at least the third arm 39 and the wrist members 40 to 42. The industrial robot 20 is provided with a cable support system 19 for supporting the cable 22. The cable support system 19 keeps the cable 22 extending along the wrist members 40 to 42 when the wrist members 40 to 42 are moved. The cable support system 19 supports mainly a portion of the cable 22 extending on the third arm 39, namely, a first driving unit, and a first wrist member 40, namely, a second driving unit.

Referring to FIGS. 19 to 21, the second wrist member 41 is substantially U-shaped and defines a hollow. A front part of the first wrist member 40 is inserted in the hollow of the second wrist member 41. The first wrist member 40 and the second wrist member 41 are connected by the second wrist joint 34. The second wrist member 41 and the third wrist member 42 are connected by the third wrist joint 35.

The industrial robot 20 is provided with a third fixing part 91 to turn the cable 22 together with the second driving unit 40. The third fixing part 91 is disposed at a position at a distance in the forward direction X1 from a first part 86 of a second fixing part 82. As shown in FIG. 20, the third fixing part 91 is placed on a connecting part 85 of the second fixing part 82. The third fixing part 91 fixedly holds the cable 22 and the connecting part 85. A part of the cable 22 fixedly held by the third fixing part 91 is restrained from movement in the axial direction N relative to the third fixing part 91. Thus the cable 22 can be prevented from being pulled out of the deformable structure 83 when the second wrist member 41 and the third wrist member 42 are turned.

The industrial robot 20 is provided with a cable guide 52 for guiding the cable 22. The cable guide 52 is connected to the second wrist member 41. More concretely, the cable guide 52 is connected to the second wrist member 41 by a first connecting member 53. The first connecting member 53 is fixed to the second wrist member 41.

The first connecting member 53 has a base part 53*a* extending from the second wrist member 41 and a holding part 53*b* extending from the base part 53*a* parallel to a second axis L2. The cable guide 52 is connected to the holding part 53*b* of the first connecting member 53 and lies on the second axis L2. The second axis L2 extends through the cable guide 52.

The cable guide 52 has a base part 54 connected to the holding part 53*b*, and a guide part 55 extending along the second axis L2 from the base part 54. The guide part 55 has a hole through which the cable 22 is passed. The hole of the guide part 55 is formed in a diameter greater than the diameter of the cable 22. The axis of the hole is perpendicular to the second axis L2.

A part 22*b* of the cable 22 extending from the third fixing part 91 in the forward direction X1 passes the hole of the cable guide 52 and extends toward the welding gun 21. The cable 22 is passed loosely through the hole of the cable guide 52 such that the cable 22 is able to move and turn relative to the cable guide 52.

The industrial robot 20 is provided with a front cable fixing part 56. The front cable fixing part 56 fixedly holds a part of the cable 22 on the third wrist member 42. The front cable fixing part 56 is fixedly connected to a front part 58 of the third wrist member 42 by a second connecting member 60. A part of the cable 22 extending in the forward direction X1 from the front cable fixing part 56 is connected to the welding gun 21.

The industrial robot 20 is provided with a cover 61 covering a part of the cable 22 extending between the second fixing part 82 and the front cable fixing part 56. The cover 61 restrains the cable 22 from being further away from the wrist members 40, 41 and 42. The cover 61 has a tubular shape. The hole of the cable guide 52 is formed so that the cover 61 can be passed through the hole of the cable guide 52.

The cover 61 is flexible and elastic. A coil spring is wound helically around the cover member 61. The cover 61 has one end 92 fixed to the connecting part 85 of the second fixing part 82 and the other end 93 fixed to the front part 58 of the third wrist member 42. The length and resilience of the coil spring are determined such that the cover 61 is not displaced greatly in a deformed state where the wrist members 40 to 42 are moved in a maximum degree from a standard state.

The coil spring can restrain the cover 61 from being greatly deformed when the wrist members 40 to 42 are moved. Obstruction of the operation of the industrial robot 22 by the cover 61 and the cable 22 extended in the cover 61 can be prevented. When the first wrist member 40 is turned relative to the third arm 39, a part 61*b* of the cove 61 extending in the forward direction from the cable guide 52 is pulled in the backward direction X2. When the third wrist member 42 is turned relative to the second wrist member 41, the a part 61*a* of the cover 61 extending in the backward direction X2 from the cable guide 52 is pulled in the forward direction X1. The resilience of the coil spring restores the cover 61 to its standard state. Thus the coil spring prevents the cover 61 from excessively slackening.

In this embodiment, the cable 22 is a bundle of a plurality of small cables. The small cables include a power supply cable for carrying a welding current, four hoses for carrying water, two servo gun cables for carrying servo signals and a thermo cable for temperature measurement. Those small cables are only examples.

The cable support system 19 in this embodiment can prevent the cable 22 from being away from the first driving unit 29 even if the cable 22 slackens in the cover 61 and can prevent the interference between the slackened cable 22 and the peripheral device. Consequently, the life of the cable can be extended and the welding gun 21 can be disposed in a narrow space. Since the deformable structure 83 has a high strength, the deformable structure 83 can be surely prevented being away from the robot when the position of the cable support system 19 changes according to the operation of the robot. Even if the axis L is either horizontal or vertical, the deformable structure 83 does not need to be supported by support members and can surely autonomously hold its attitude.

Even if the cable supported by the cable support system 19 is heavy or the robot operates at a high operating speed, the deformable structure 83 having a high strength can maintain a curved shape of a small radius of curvature. Therefore, the deformable structure 83 will not collide against the peripheral device even if the robot operates in a narrow working space. The deformable structure 83 can hold its attitude autonomously with out being assisted by guide members even if the second driving unit 40 is turned through a large angle relative to the first driving unit 39. The deformable structure 83 can be kept in a curved shape by the spacers 104. The deformable structure 83 can be held in a desired deformed state even if the deformable structure 83 is deformed repeatedly.

Since the cable 22 does not move in the forward direction X1 relative to a cable holding part 51, the excessive slackening of the part 22b of the cable 22 extending between the cable holding part 51 and the cable guide 52 can be prevented. Thus possibility of the cable 22 coming into contact with the wrist members 40 to 42 can be reduced.

Since the cable 22 is wound round the first driving unit, the first wrist member 40 can turn in a wide angular range while the slack cable 22 is tightened even if the first driving unit is short. The robot is lightweight and inexpensive because any guide rings are not necessary.

The preferred embodiments of the present invention described herein are only examples of the present invention and various changes may be made therein without departing from the scope of the present invention. Although the cable support system 19 has been described as applied to the industrial robot, the cable support system 19 can be combined with the driving apparatus 150 having the first and the second driving unit capable of turning about the axis relative to each other. The cable support system 19 may be used in combination with driving apparatuses other than the industrial robot, such as machine tools and automobile manufacturing apparatuses. Although the second driving unit 40 is supposed to turn relative to the first driving unit 39 in this embodiment, the first driving unit 39 may turn relative to the second driving unit 40. Although the deformable structure 83 is disposed near the first driving unit 39, the deformable structure 83 may be disposed near the second driving unit 40 or may be extended along both the first driving unit 39 and the second driving unit 40.

What is claimed is:

1. An approximately arc-shaped, elongate, deformable structure which is deformable by a predetermined amount, the deformable structure being adapted for use in a cable support system that supports a flexible cable, the deformable structure comprising:
   a plurality of connecting parts arranged along a longitudinal axis of the deformable structure and connected to each other so that each of the connecting parts is turnable relative to an adjacent connecting part through a predetermined angle about a first axis of the connecting part intersecting the longitudinal axis;
   a plurality of base parts each of which extends in a first direction parallel to the first axis and connects to one of the plurality of connecting parts; and
   a plurality of stopping parts each formed on at least one of two longitudinally adjacent base parts, each of the stopping parts projecting from the base part in the longitudinal direction from a position different from a position of the connecting part in the first direction, the stopping part being configured to come into contact with an adjacent base part so that two first axes of two adjacent connecting parts respectively connected to the two longitudinally adjacent base parts are always kept inclined relative to each other.

2. The deformable structure according to claim 1, wherein:
   each of the base parts comprises two base parts extending in opposite first directions with respect to each of the connecting parts, and
   each of the stopping parts comprises two stopping parts formed on the two base parts respectively.

3. An approximately arc-shaped, elongate, deformable structure which is deformable by a predetermined amount, the deformable structure being adapted for use in a cable support system that supports a flexible cable, the deformable structure comprising:
   a plurality of connecting parts arranged along a longitudinal axis of the deformable structure and connected to each other so that each of the connecting parts is turnable relative to an adjacent connecting part through a predetermined angle about a first axis of the connecting part intersecting the longitudinal axis;
   a plurality of base parts each of which extends in a first direction parallel to the first axis and connects to one of the plurality of connecting parts; and
   a plurality of stopping parts each formed on at least one of two longitudinally adjacent base parts, each of the stopping parts projecting from the base part in the longitudinal direction from a position different from a position of the connecting part in the first direction, the stopping part being configured to come into contact with an adjacent base part so that two first axes of two adjacent connecting parts respectively connected to the two longitudinally adjacent base parts are inclined relative to each other
   wherein a first part of the two adjacent connecting parts is configured to turn relative to a second part of the two adjacent connecting parts about a second axis which is perpendicular to the first axis and the longitudinal axis, and
   wherein each of the stopping parts is detachably attached to one of the two longitudinally adjacent base parts.

4. The deformable structure according to claim 1, wherein the stopping part has a surface facing the adjacent base part, the surface being curved about the first axis so as to form a curved surface of a fixed radius of curvature having a center on the first axis.

5. The deformable structure according to claim 1, wherein the adjacent base part has a contact part with which an adjacent stopping part comes into contact, the contact part being configured to be in contact with the stopping part on both sides with respect to an imaginary plane containing the longitudinal axis and the first axis.

6. An approximately arc-shaped, elongate, deformable structure which is deformable by a predetermined amount, the deformable structure being adapted for use in a cable support system that supports a flexible cable, the deformable structure comprising:
   a plurality of connecting parts arranged along a longitudinal axis of the deformable structure and connected to each other so that each of the connecting parts is turnable relative to an adjacent connecting part through a predetermined angle about a first axis of the connecting part intersecting the longitudinal axis;
   a plurality of base parts each of which extends in a first direction parallel to the first axis and connects to one of the plurality of connecting parts;
   a plurality of stopping parts each formed on at least one of two longitudinally adjacent base parts, each of the stopping parts projecting from the base part in the longitudinal direction from a position different from a position of the connecting part in the first direction, the stopping part being configured to come into contact with an adjacent base part so that two first axes of two adjacent connecting parts respectively connected to the two longitudinally adjacent base parts inclined relative to each other; and
   a retaining member configured to retain the stopping part in contact with the adjacent base part.

7. A cable support system adapted to be installed on a driving apparatus including a first driving unit and a second driving unit capable of turning about a predetermined rotational axis relative to the first driving unit to support a flexible cable extending between the first driving unit and the second driving unit, comprising:
   a first fixing part fixed to the first driving unit;
   a second fixing part fixed to the second driving unit so as to be apart from the first fixing part in a direction of the rotational axis;
   the deformable structure as defined in claim 1, the deformable structure having a first end fixed to the first fixing part and a second end fixed to the second fixing part so as to extend in a curve around the driving apparatus, each of the connecting parts being restrained from turning about an axis parallel to the rotational axis relative to an adjacent connecting part by each of the stopping parts and allowed to turn about an axis perpendicular to the rotational axis through a predetermined angle; and
   a holding member configured to hold a cable along the longitudinal axis of the deformable structure.

8. The cable support system according to claim 7, wherein:
   each of the base parts comprises two base parts extending in opposite first directions with respect to each of the connecting parts, and
   each of the stopping parts comprises two stopping parts formed on the two base parts respectively.

9. A cable support system adapted to be installed on a driving apparatus including a first driving unit and a second driving unit capable of turning about a predetermined rotational axis relative to the first driving unit to support a flexible cable extending between the first driving unit and the second driving unit, the cable support system comprising:
   a first fixing part fixed to the first driving unit;
   a second fixing part fixed to the second driving unit so as to be apart from the first fixing part in a direction of the rotational axis;
   an approximately arc-shaped, elongate, deformable structure which is deformable by a predetermined amount, the deformable structure being adapted for use in a cable support system that supports a flexible cable, the deformable structure comprising:
      a plurality of connecting parts arranged along a longitudinal axis of the deformable structure and connected to each other so that each of the connecting parts is turnable relative to an adjacent connecting part through a predetermined angle about a first axis of the connecting part intersecting the longitudinal axis;
      a plurality of base parts each of which extends in a first direction parallel to the first axis and connects to one of the plurality of connecting parts; and
      a plurality of stopping parts each formed on at least one of two longitudinally adjacent base parts, each of the stopping parts projecting from the base part in the longitudinal direction from a position different from a position of the connecting part in the first direction, the stopping part being configured to come into contact with an adjacent base part so that two first axes of two adjacent connecting parts respectively connected to the two longitudinally adjacent base parts are inclined relative to each other;
   a first end fixed to the first fixing part and a second end fixed to the second fixing part so as to extend in a curve around the driving apparatus, each of the connecting parts being restrained from turning about an axis parallel to the rotational axis relative to an adjacent connecting part by each of the stopping parts and allowed to turn about an axis perpendicular to the rotational axis through a predetermined angle; and
   a holding member configured to hold a cable along the longitudinal axis of the deformable structure,
   wherein a first part of the two adjacent connecting parts is configured to turn relative to a second part of the two adjacent connecting parts about a second axis which is perpendicular to the first axis and the longitudinal axis, and
   wherein each of the stopping parts is detachably attached to one of the two longitudinally adjacent base parts.

10. The cable support system according to claim 7, wherein the stopping part has a surface facing the adjacent base part, the surface being curved about the first axis so as to form a curved surface of a fixed radius of curvature having a center on the first axis.

11. The cable support system according to claim 7, wherein the adjacent base part has a contact part with which an adjacent stopping part comes into contact, the contact part being configured to be in contact with the stopping part on both sides with respect to an imaginary plane containing the longitudinal axis and the first axis.

12. A cable support system adapted to be installed on a driving apparatus including a first driving unit and a second driving unit capable of turning about a predetermined rotational axis relative to the first driving unit to support a flexible cable extending between the first driving unit and the second driving unit, the cable support system comprising:
   a first fixing part fixed to the first driving unit;
   a second fixing part fixed to the second driving unit so as to be apart from the first fixing part in a direction of the rotational axis;
   an approximately arc-shaped, elongate, deformable structure which is deformable by a predetermined amount, the deformable structure being adapted for use in a cable support system that supports a flexible cable, the deformable structure comprising:

a plurality of connecting parts arranged along a longitudinal axis of the deformable structure and connected to each other so that each of the connecting parts is turnable relative to an adjacent connecting part through a predetermined angle about a first axis of the connecting part intersecting the longitudinal axis;

a plurality of base parts each of which extends in a first direction parallel to the first axis and connects to one of the plurality of the connecting parts; and a plurality of stopping parts each formed on at least one of two longitudinally adjacent base parts, each of the stopping parts projecting from the base part in the longitudinal direction from a position different from a position of the connecting part in the first direction, the stopping part being configured to come into contact with an adjacent base part so that two first axes of two adjacent connecting parts respectively connected to the two longitudinally adjacent base parts are inclined relative to each other;

a first end fixed to the first fixing part and a second end fixed to the second fixing part so as to extend in a curve around the driving apparatus, each of the connecting parts being restrained from turning about an axis parallel to the rotational axis relative to an adjacent connecting part by each of the stopping parts and allowed to turn about an axis perpendicular to the rotational axis through a predetermined angle;

a holding member configured to hold a cable along the longitudinal axis of the deformable structure; and a retaining member configured to retain the stopping part in contact with the adjacent base part.

* * * * *